(12) United States Patent
Sun et al.

(10) Patent No.: US 10,455,610 B2
(45) Date of Patent: Oct. 22, 2019

(54) METHOD AND APPARATUS FOR COMMUNICATIONS WITH CARRIER AGGREGATION

(71) Applicant: NEC CORPORATION, Tokyo (JP)

(72) Inventors: Zhennian Sun, Beijing (CN); Chuangxin Jiang, Beijing (CN); Yukai Gao, Beijing (CN); Gang Wang, Beijing (CN)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/758,581

(22) PCT Filed: Feb. 2, 2016

(86) PCT No.: PCT/CN2016/073223
§ 371 (c)(1),
(2) Date: Mar. 8, 2018

(87) PCT Pub. No.: WO2017/132842
PCT Pub. Date: Aug. 10, 2017

(65) Prior Publication Data
US 2018/0352570 A1 Dec. 6, 2018

(51) Int. Cl.
*H04W 72/12* (2009.01)
*H04W 72/14* (2009.01)
(Continued)

(52) U.S. Cl.
CPC .......... *H04W 72/14* (2013.01); *H04L 1/1812* (2013.01); *H04L 1/1887* (2013.01); *H04W 72/0446* (2013.01); *H04W 72/1289* (2013.01)

(58) Field of Classification Search
CPC ............ H04W 72/14; H04W 72/0446; H04W 72/1289; H04L 1/1887; H04L 1/1812
See application file for complete search history.

(56) References Cited

U.S. PATENT DOCUMENTS

2007/0047485 A1* 3/2007 Gorokhov ......... H04W 72/1231
370/329
2015/0334685 A1 11/2015 Ji et al.
(Continued)

FOREIGN PATENT DOCUMENTS

CN      102740407 A    10/2012
EP      2 728 961 A1    5/2014
(Continued)

OTHER PUBLICATIONS

International Search Report for PCT/CN2016/073223 dated Oct. 26, 2016.
(Continued)

*Primary Examiner* — Lakeram Jangbahadur
(74) *Attorney, Agent, or Firm* — Sughrue Mion, PLLC

(57) ABSTRACT

Embodiments of the present disclosure provide a method at a base station for performing data transmission to a user equipment in a communications system supporting carrier aggregation of at least one first carrier on which a short TTI is applied and at least one second carrier on which a long TTI is applied. The method comprises transmitting at least one DL scheduling grant corresponding to data transmission to the user equipment in a DL control region of at least one of a short TTI on a first carrier and a long TTI on a second carrier and performing DL data transmission towards the user equipment in a data transmission region of a short TTI on the first carrier and in the data transmission region of a long TTI on the second carrier as indicated by the at least one DL scheduling grant. There are also provided a method for performing data transmission at a user equipment and a method for transmitting HARQ feedback at a base station or a user equipment.

13 Claims, 32 Drawing Sheets

(51) Int. Cl.
*H04L 1/18* (2006.01)
*H04W 72/04* (2009.01)

(56) References Cited

U.S. PATENT DOCUMENTS

| | | | |
|---|---|---|---|
| 2015/0351093 A1 | 12/2015 | Au et al. | |
| 2018/0213489 A1* | 7/2018 | Andou | H04W 16/32 |
| 2018/0242316 A1* | 8/2018 | Takeda | H04W 72/0446 |

FOREIGN PATENT DOCUMENTS

| | | | |
|---|---|---|---|
| JP | 2015523825 A | | 8/2015 |
| WO | 2007/025160 A2 | | 3/2007 |
| WO | 2009/055577 A1 | | 4/2009 |
| WO | 2013/042936 A1 | | 3/2013 |
| WO | 2015/012927 A1 | | 1/2015 |
| WO | 2017033839 A1 | | 3/2017 |

OTHER PUBLICATIONS

Notification of Reasons for Refusal dated Feb. 5, 2019 from the Japanese Patent Office in application No. 2018-523441.
ETRI, 5G Vision and Enabling Technologies: ETRI Perspective, 3GPP, 2015, RWS-150029, http://www.3gpp.org/ftp/workshop/2015-09-17_18_RAN_5G/Docs/RWS-150029.zip
Intel Corporation, View on 5G Radio Technology and Standardization, 3GPP, 2015, RWS-150023, http://wwww.3gpp.org/ftp/workshop/2015-09-17 _18_Ran_5G/Docs/RWS-150023.zip.
Huawei et al., "Overview of short TTI", 3GPP TSG RAN WG1 Meeting #83 R1-156458, 3RD Generation Partnership Project (3GPP), Anaheim, USA, Nov. 15-22, 2015, 5 pages total.
Extended European Search Report dated Feb. 22, 2019 issued by the European Patent Office in counterpart application No. 16888667.9.
Extended European Search Report corresponding to European Application No. 16 88 8667.9, dated May 8, 2019.
Approved minutes of 3GPP TSG RAN WG1 #46 in Tallinn (Tallinn, Estonia, Aug. 28-Sep. 1, 2006); 3GPP TSG RAN WG1 Meeting #46bis Seoul, Korea, Oct. 9-13, 2006; R1-063013; XP 50448868A I; 101 pages.
3rd Generation Partnership Project; Technical Specification Group Radio Access Network; Feasibility Study on Uplink Enhancements for UTRA TDD; (Release 6); 3GPP TR 25.804 V1.0.1 (Feb. 2005); XP 50380324A I; 57 pages.
Communication dated Feb. 22, 2019 from the European Patent Office in application No. 16888667.9.
Intel Corporation "View on 5G Radio Technology and Standardization", 3GPP Draft, RWS-150023, Phoenix, AZ, Sep. 17-18, 2015, pp. 2-16 (17 pages).
Decision of Reasons for Refusal dated Jun. 11, 2019 from the Japanese Patent Office in application No. 2018-523441.

* cited by examiner

☐ GP    ▥ Downlink control    ☰ Uplink control    ▨ DL/UL data

▨ GP     ⦀ Downlink control     ☰ Uplink control     ▒ DL/UL data

▨ GP    ▥ Downlink control    ▤ Uplink control    ▦ DL/UL data

▨ GP   ⊞ Downlink control   ☰ Uplink control   ▨ DL/UL data

GP   Downlink control   Uplink control   DL/UL data

METHOD AND APPARATUS FOR COMMUNICATIONS WITH CARRIER AGGREGATION

CROSS REFERENCE TO RELATED APPLICATIONS

This application is a National Stage of International Application No. PCT/CN2016/073223 filed Feb. 2, 2016.

TECHNICAL FIELD

Embodiments of the present disclosure generally relate to the wireless communications technology and more particularly to methods and apparatuses for data transmission and Hybrid Automatic Repeat reQuest (HARQ) feedback in a wireless communications system supporting Carrier Aggregation (CA).

BACKGROUND

This section introduces aspects that may facilitate better understanding of the present disclosure. Accordingly, the statements of this section are to be read in this light and are not to be understood as admissions about what is in the prior art or what is not in the prior art.

While the standardization of the fourth generation (4G) radio access technology (RAT), i.e. Long Term Evolution-Advanced (LTE-A), is still ongoing, the discussion on a Beyond 4G, which is usually referred to as 5G, system has already started. In the 5G system, requirements on latency are even tighter, which leads to a short round-trip time (RTT) with fast control signaling, and support for a flexible Uplink (UL)/Downlink (DL) ratio.

Accordingly, a physical subframe structure for 5G systems has been proposed, as illustrated in FIG. 1. As illustrated, each subframe or Transmission Time Interval (TTI) comprises a DL control region, an UL control region and a DL/UL data transmission region in this order. For example, the DL control region may be used by a base station to transmit a DL scheduling grant or an UL scheduling grant to a user equipment, or to transmit a HARQ feedback for an UL data transmission of the user equipment; the UL control region may be used by a user equipment to transmit a HARQ feedback for a DL data transmission; and the data transmission region may be used to transmit a DL data transmission from a base station or to transmit an UL data transmission from a user equipment, according to the respective scheduling grant. The control regions are located before the data transmission region so as to enable fast and cost efficient pipeline processing at a receiver.

Another proposal for a physical subframe structure for 5G systems is illustrated in FIG. 2. As illustrated, each subframe or TTI comprises a DL control region, a DL/UL data transmission region and an UL control region in this order. In this structure, the DL control region is located before the data transmission, which is located before the UL control region, so as to minimize HARQ RTT.

In LTE-A, Carrier Aggregation of multiple component carriers with subframes/TTIs of the same length being applied is adopted to improve throughput. However, in 5G systems, with carrier frequencies becoming further higher, subframes/TTIs of different lengths may be adopted on different carriers in even higher frequency bands.

SUMMARY

Various embodiments of the present disclosure aim at providing an efficient solution for performing data communications between a base station and a user equipment to accommodate TTIs of different lengths with carrier aggregation in 5G systems. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method performed at a base station for performing data transmission to a user equipment in a wireless communications system supporting carrier aggregation of at least one first carrier on which a short TTI is applied and at least one second carrier on which a long TTI is applied. The method comprises transmitting at least one downlink scheduling grant corresponding to data transmission to the user equipment in a downlink control region of at least one of a short TTI on a first carrier and a long TTI on a second carrier and performing downlink data transmission towards the user equipment in a data transmission region of a short TTI on the first carrier and in the data transmission region of a long TTI on the second carrier as indicated by the at least one downlink scheduling grant.

In a second aspect of the present disclosure, there is provided a method performed at a user equipment for transmitting HARQ feedback to a base station in a communications system supporting carrier aggregation of at least one first carrier on which a short TTI is applied and at least one second carrier on which a long TTI is applied. The method comprises receiving downlink data transmission from the base station in a data transmission region of a long TTI on a second carrier and in the data transmission region of a short TTI on a first carrier and transmitting HARQ feedback for the received downlink data transmission towards the base station in an uplink control region of at least one of a short TTI on the first carrier and a long TTI on the second carrier.

In a third aspect of the present disclosure, there is provided a method performed at a user equipment for performing data transmission to a base station in a communications system supporting carrier aggregation of at least one first carrier on which a short TTI is applied and at least one second carrier on which a long TTI is applied. The method comprises receiving at least one uplink scheduling grant for data transmission to the base station in a downlink control region of at least one of a short TTI on a first carrier and a long TTI on a second carrier and performing uplink data transmission towards the base station in a data transmission region of a short TTI on the first carrier and in the data transmission region of a long TTI on the second carrier as indicated by the at least one uplink scheduling grant.

In a fourth aspect of the present disclosure, there is provided a method performed at a base station for transmitting HARQ feedback to a user equipment in a communications system supporting carrier aggregation of at least one first carrier on which a short TTI is applied and at least one second carrier on which a long TTI is applied. The method comprises receiving uplink data transmission from the user equipment in a data transmission region of a short TTI on a first carrier and in the data transmission region of a long TTI on a second carrier and transmitting HARQ feedback for the received uplink data transmission towards the user equipment in a downlink control region of at least one of a short TTI on the first carrier and a long TTI on the second carrier.

In a fifth aspect of the present disclosure, there is provided an apparatus at a base station for performing data transmission to a user equipment in a communications system supporting carrier aggregation of at least one first carrier on which a short TTI is applied and at least one second carrier on which a long TTI is applied. The apparatus comprises a scheduler configured to transmit at least one downlink scheduling grant corresponding to data transmission to the user equipment in a downlink control region of at least one of a short TTI on a first carrier and a long TTI on a second carrier and a transmitter configured to perform downlink data transmission towards the user equipment in a data transmission region of a short TTI on the first carrier and in the data transmission region of a long TTI on the second carrier as indicated by the at least one downlink scheduling grant.

In a sixth aspect of the present disclosure, there is provided an apparatus at a user equipment for transmitting HARQ feedback to a base station in a communications system supporting carrier aggregation of at least one first carrier on which a short TTI is applied and at least one second carrier on which a long TTI is applied. The apparatus comprises a receiver configured to receive downlink data transmission from the base station in a data transmission region of a long TTI on a second carrier and in the data transmission region of a short TTI on a first carrier and a transmitter configured to transmit HARQ feedback for the received downlink data transmission towards the base station in an uplink control region of at least one of a short TTI on the first carrier and a long TTI on the second carrier.

In a seventh aspect of the present disclosure, there is provided an apparatus at a user equipment for performing data transmission to a base station in a communications system supporting carrier aggregation of at least one first carrier on which a short TTI is applied and at least one second carrier on which a long TTI is applied. The apparatus comprises a receiver configured to receive at least one uplink scheduling grant for data transmission to the base station in a downlink control region of at least one of a short TTI on a first carrier and a long TTI on a second carrier and a transmitter configured to perform uplink data transmission towards the base station in a data transmission region of a short TTI on the first carrier and in the data transmission region of a long TTI on the second carrier as indicated by the at least one uplink scheduling grant.

In an eighth aspect of the present disclosure, there is provided an apparatus at a base station for transmitting HARQ feedback to a user equipment in a communications system supporting carrier aggregation of at least one first carrier on which a short TTI is applied and at least one second carrier on which a long TTI is applied. The apparatus comprises a receiver configured to receive uplink data transmission from the user equipment in a data transmission region of a long TTI on a second carrier and in the data transmission region of a short TTI on a first carrier and a transmitter configured to transmit HARQ feedback to the received uplink data transmission towards the user equipment in a downlink control region of at least one of a short TTI on the first carrier and a long TTI on the second carrier.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which.

Like reference numbers and designations in the various drawings indicate like elements.

DETAILED DESCRIPTION

Figure 1:
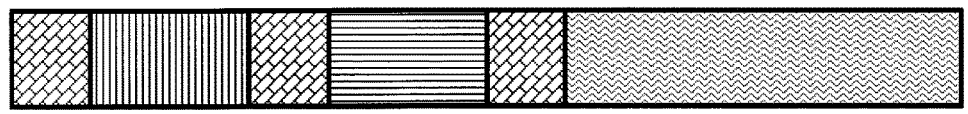
FIG. 1 illustrates a proposed physical subframe structure for 5G systems.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "an embodiment," "another embodiment," "a further embodiment," and the similar expressions indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to limit the embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs. For example, the term "base station" (BS), used herein may also be referred to as e.g. eNB, eNodeB, NodeB or base transceiver station (BTS), Access Node (AN) or Access Point (AP) etc. depending on the technology and terminology used. Likewise, the term "user equipment" (UE) used herein may refer to any terminal device having wireless communications capabilities, including but not limited to, mobile phones, cellular phones, smart phones, or personal digital assistants (PDAs), portable computers, image capture devices such as digital cameras, gaming devices, music storage and playback appliances and any portable units or terminals that have wireless communications capabilities, or Internet appliances permitting wireless Internet access and browsing and the like.

Hereafter, embodiments of the present disclosure propose a novel solution for data transmission and HARQ feedback applicable to a wireless communications system supporting carrier aggregation of frequency carriers on which various TTIs of different lengths are applied.

Figure 3:
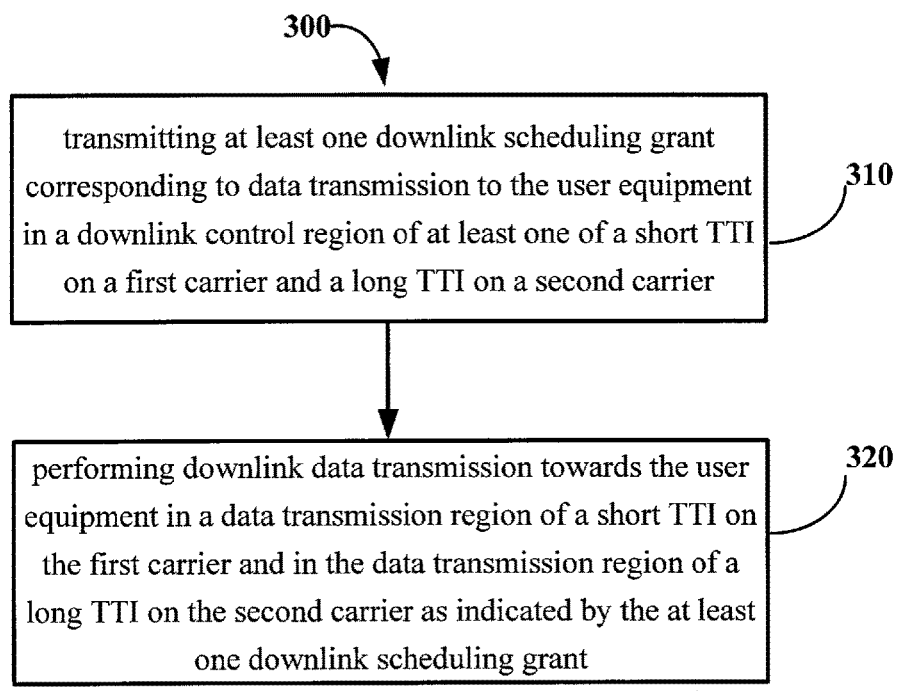
FIG. 3 illustrates a flowchart of a method 300 for data transmission according to some embodiments of the present disclosure.

FIG. 3 illustrates a flowchart of a method 300 for data transmission according to some embodiments of the present disclosure. The method 300 is performed at a base station for performing data transmission to a user equipment in a wireless communications system supporting carrier aggregation of at least one component carrier (which will be referred to as "first carrier" hereafter) on which a short TTI is applied and at least one component carrier (which will be referred to as "second carrier" hereafter) on which a long TTI is applied. Each of the long TTI and the short TTI may comprise a DL control region, an UL control region and a data transmission region, but not necessarily in this order. As an example, the DL control region may be used by the base station to transmit a DL scheduling grant or an UL scheduling grant to the user equipment. The data transmission region may be used to transmit a DL data transmission from the base station to the user equipment, corresponding to the respective scheduling grant.

Please note that the terms "short" and "long" used herein merely refers to a relative length relationship, wherein a long TTI has a relative longer length than a short TTI. The expression like "a carrier on which a long/short TTI is applied" used herein means the timing for any transmission on that carrier complies with the structure of the corresponding TTI.

As illustrated in FIG. 3, the method 300 starts at block 310, in which the base station transmits at least one DL scheduling grant corresponding to data transmission to the user equipment in the DL control region of a long TTI on a second carrier, or in the DL control region of a short TTI on a first carrier, or in the DL control regions of both the long TTI on the second carrier and the short TTI on the first carrier.

Then at block 320, the base station performs DL data transmission towards the user equipment in the data transmission region of a long TTI on the second carrier and in the data transmission region of a short TTI on the first carrier as indicated by the at least one DL scheduling grant.

In a FIRST embodiment of the method 300, the base station may transmit, in the DL control region of a long TTI on the second carrier, a DL scheduling grant corresponding to DL data transmission on the second carrier and transmit, in the DL control region of a short TTI on the first carrier, a DL scheduling grant corresponding to DL data transmission on the first carrier. In this embodiment, the base station may perform the DL data transmission on the first carrier in the short TTI where the corresponding DL scheduling grant is transmitted or in a short TTI immediately following the short TTI where the corresponding DL scheduling grant is transmitted. Likewise, the base station may perform the DL data transmission on the second carrier in the long TTI where the corresponding DL scheduling grant is transmitted or in a long TTI immediately following the long TTI where the corresponding DL scheduling grant is transmitted.

Figure 4A:
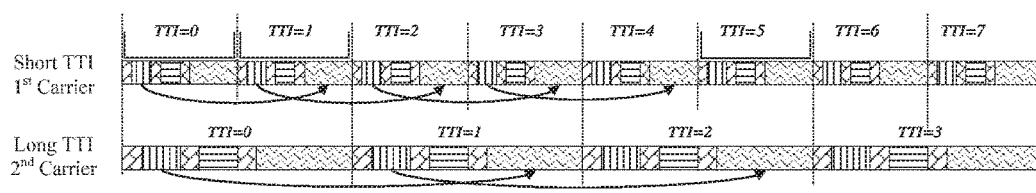
FIGS. 4A and 4B show two examples illustrating a relationship between scheduling grant transmission and data transmission with the frame structure as shown in FIG. 1, according to the first embodiment of the method 300.
Figure 4B:
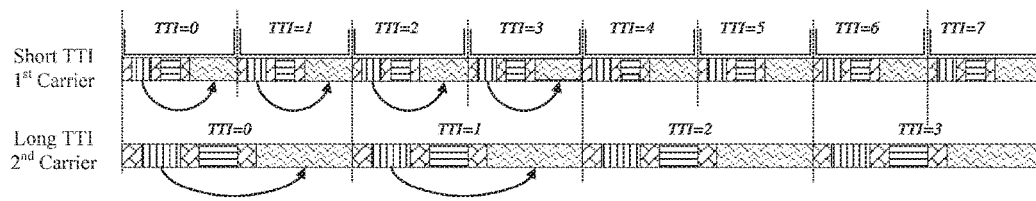

FIGS. 4A and 4B illustrate two examples illustrating a relationship between DL scheduling and data transmission with the frame structure as shown in FIG. 1, according to the first embodiment of the method 300. Please note that this example is provided for the illustrative purpose only, but not for any limitation to the present disclosure.

In this figure and following FIGS. 5-9, the icon represents a guard period (GP); the icon represents a DL control region; the icon represents an UL control region; and the icon represents a data transmission region for DL or UL data transmission. A sequence of TTIs indicates the timing for transmission between the base station and the user equipment. Also, the curved arrows shown in the figure indicate a relationship between DL scheduling and data transmission.

As illustrated in FIGS. 4A and 4B, the base station transmits a DL scheduling grant corresponding to DL transmission on the first carrier in the DL control region of each short TTI and also transmits the DL scheduling grant for DL transmission on the second carrier in the DL control region of each long TTI.

Corresponding to the scheduling, the DL data transmission on a carrier may be performed in a TTI (including long and short TTIs) immediately following the TTI where the corresponding DL scheduling grant is transmitted on the same carrier. In the example as shown in FIG. 4A, the base station may transmit a DL scheduling grant on the first carrier in the DL control region of short TTI 0 and then perform DL data transmission on the first carrier in the DL data transmission region of short TTI 1. Likewise, the base station may transmit a DL scheduling grant on the second carrier in the DL control region of long TTI 0 and then perform DL data transmission on the second carrier in the DL data transmission region of long TTI 1.

As an alternative, corresponding to the scheduling, the DL data transmission on a carrier may be performed in the TTI (including long and short TTIs) where the corresponding DL scheduling grant is transmitted on the same carrier. In the example as shown in FIG. 4B, the base station may transmit a DL scheduling grant on the first carrier in the DL control region of short TTI 0 and then perform DL data transmission on the first carrier in the DL data transmission region of the same short TTI 0. Likewise, the base station may transmit a DL scheduling grant on the second carrier in the DL control region of long TTI 0 and then perform DL data transmission on the second carrier in the DL data transmission region of the same long TTI 0.

As another alternative, corresponding to the scheduling, the DL data transmission on the first carrier may be performed in a short TTI immediately following the short TTI where the corresponding DL scheduling grant is transmitted, while the DL data transmission on the second carrier may be performed in the long TTI where the corresponding DL scheduling grant is transmitted; or the DL data transmission on the first carrier may be performed in the short TTI where the corresponding DL scheduling grant is transmitted, while the DL data transmission on the second carrier may be performed in a long TTI immediately following the long TTI where the corresponding DL scheduling grant is transmitted. This alternative case is not shown in the figure.

Figure 2:
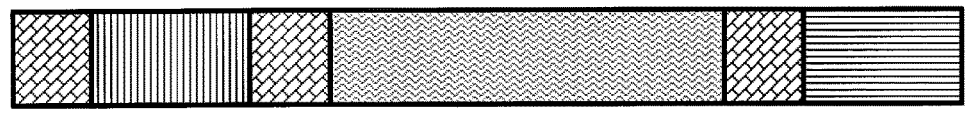
FIG. 2 illustrates another proposed physical subframe structure for 5G systems.
Figure 5:
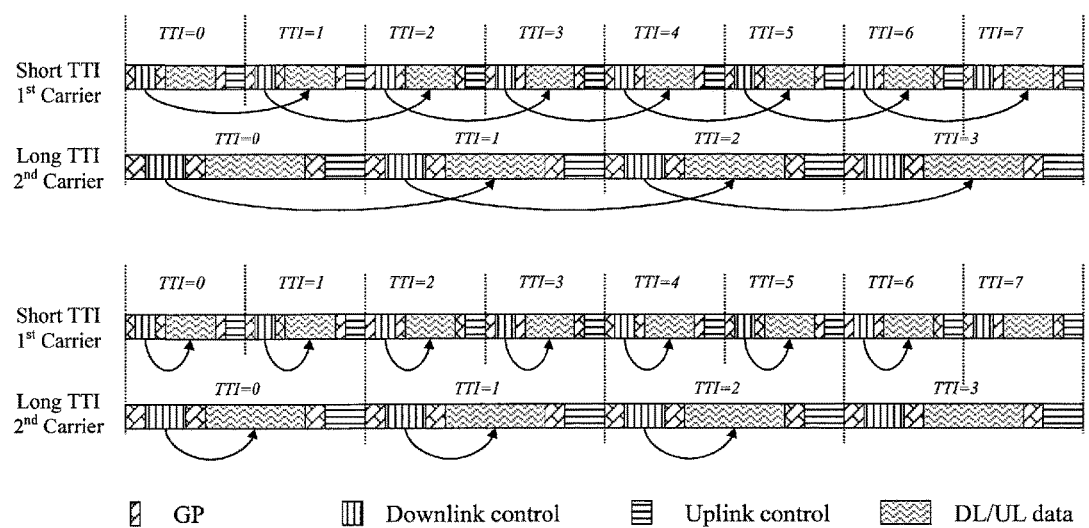
FIG. 5 shows another example illustrating a relationship between scheduling grant transmission and data transmission with the frame structure as shown in FIG. 2, according to the first embodiment of the method 300.

FIG. 5 illustrates another example illustrating a relationship between DL scheduling and data transmission with the frame structure as shown in FIG. 2, according to the first embodiment of the method 300. Please note that this example is provided for the illustrative purpose only, but not for any limitation to the present disclosure. The only difference between FIG. 5 and FIGS. 4A and 4B lies in the usage of different frame structures. In FIG. 5, the DL scheduling and the data transmission present the same relationship as described above with reference to FIGS. 4A and 4B, which thus will not be detailed herein.

In a SECOND embodiment of the method 300, the base station may transmit, in the DL control region of a short TTI on the first carrier, a DL scheduling grant corresponding to data transmission on the first carrier and also transmit, in the DL control region of a short TTI on the first carrier, a DL scheduling grant corresponding to data transmission on the second carrier.

In this embodiment, the DL data transmission on the first carrier may be performed in the short TTI where the corresponding DL scheduling grant is transmitted or in a short TTI immediately following the short TTI where the corresponding DL scheduling grant is transmitted. Correspondingly, the DL data transmission on the second carrier may be performed in a long TTI whose index $n_{long}$ and the index $n_{short}$ of the short TTI where the corresponding DL scheduling grant is transmitted have a relationship of $n_{long}=n_{short}/2$, wherein $n_{short}$ is an even integer.

Figure 6A:
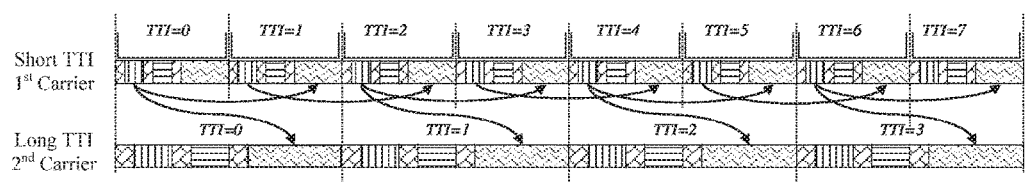
FIGS. 6A and 6B show two examples illustrating a relationship between scheduling grant transmission and data transmission with the frame structure as shown in FIG. 1, according to the second embodiment of the method 300.
Figure 6B:
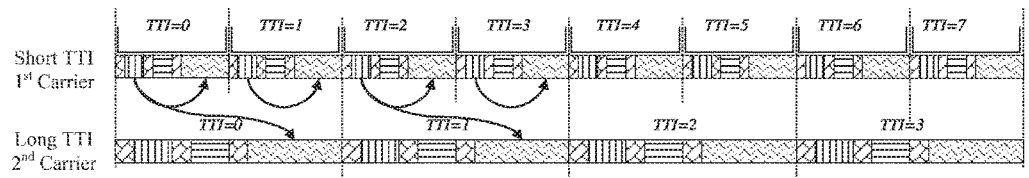

FIGS. 6A and 6B illustrate two examples illustrating a relationship between DL scheduling and data transmission with the frame structure as shown in FIG. 1, according to the second embodiment of the method 300. Please note that this example is provided for the illustrative purpose only, but not for any limitation to the present disclosure.

As illustrated in FIGS. 4A and 4B, the base station may transmit the DL scheduling grant corresponding to DL transmission on the first carrier in the DL control region of a short TTI and transmit the DL scheduling grant corresponding to DL transmission on the second carrier also in the DL control region of a short TTI on the first carrier. Generally, the base station may transmit the DL scheduling grant corresponding to the DL transmission on the first carrier in each short TTI, and transmit the DL scheduling grant corresponding to the DL transmission on the second carrier in every two or more short TTIs, depending on a ratio of the length of the short TTI to the length of the long TTI.

Corresponding to the scheduling, the DL data transmission on the first carrier may be performed in a short TTI immediately following the short TTI where the DL scheduling grant corresponding to the DL data transmission on the first carrier is transmitted, while the DL data transmission on the second carrier may be performed in a long TTI having an index $n_{long}$. The index $n_{long}$ and the index $n_{short}$ of the short TTI where the DL scheduling grant corresponding to the DL data transmission on the second carrier is transmitted have a relationship of $n_{long}=n_{short}/2$, wherein $n_{short}$ is an even integer. In the example as shown in FIG. 6A, the base station transmits a DL scheduling grant for DL data transmission on the first carrier in the DL control region of short TTI 0 and then performs the DL data transmission on the first carrier in the DL data transmission region of short TTI 1. Subsequently, the base station transmits another DL scheduling grant on the first carrier in the DL control region of short TTI 1 and then performs the DL data transmission on the first carrier in the DL data transmission region of short TTI 2. For DL data transmission on the second carrier, the base station may transmit a DL scheduling grant in the DL control region of short TTI 0 and perform the DL data transmission in the DL data transmission region of long TTI 0. Subsequently, the base station may transmit another DL scheduling grant on the second carrier in the DL control region of short TTI 2 and then perform the DL data transmission on the second carrier in the DL data transmission region of long TTI 1.

Those skilled in the art will appreciate that the number following each "TTI" as shown in the figure indicates the index of that TTI, which is usually an integer.

As an alternative, corresponding to the scheduling, the DL data transmission on the first carrier may be performed in the short TTI where the DL scheduling grant corresponding to the DL data transmission on the first carrier is transmitted, while the DL data transmission on the second carrier may be performed in a long TTI having an index $n_{long}$. The index $n_{long}$ and the index $n_{short}$ of the short TTI where the DL scheduling grant corresponding to the DL data transmission on the second carrier is transmitted have a relationship of $n_{long}=n_{short}/2$, wherein $n_{short}$ is an even integer. In the example as shown in FIG. 6B, the base station transmits a DL scheduling grant corresponding to DL data transmission on the first carrier in the DL control region of short TTI 0 and then transmits the DL data transmission on the first carrier in the DL data transmission region of the same short TTI. Subsequently, the base station transmits another DL scheduling grant on the first carrier in the DL control region of short TTI 1 and then transmits the DL data transmission on the first carrier in the DL data transmission region of the same short TTI 1. For the DL data transmission on the second carrier, the base station may transmit a DL scheduling grant on the first carrier in the DL control region of short TTI 0 and then transmit the DL data transmission in the DL data transmission region of long TTI 0. Subsequently, the base station may transmit another DL scheduling grant on the first carrier in the DL control region of short TTI 2 and then transmit the DL data transmission on the second carrier in the DL data transmission region of long TTI 1.

Figure 7:
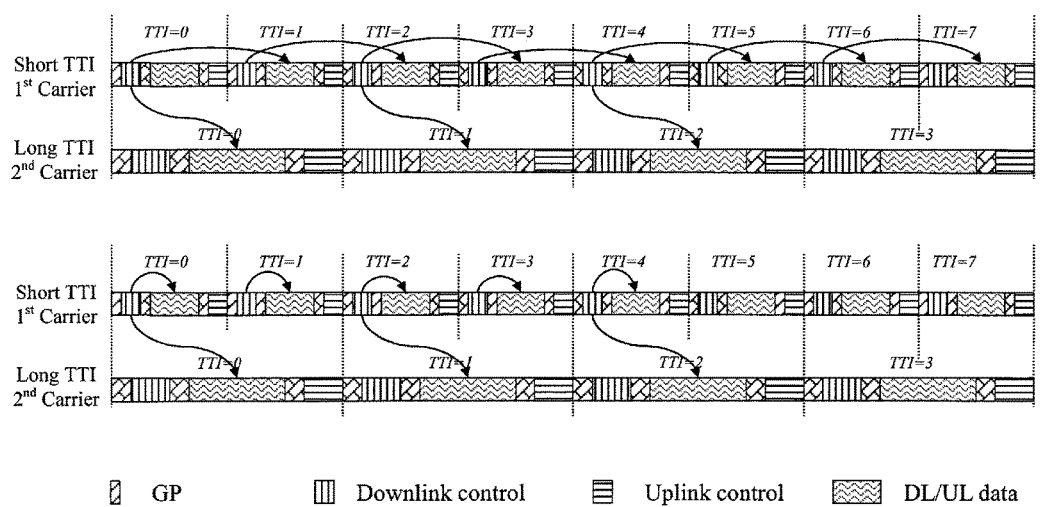
FIG. 7 shows another example illustrating a relationship between scheduling grant transmission and data transmission with the frame structure as shown in FIG. 2, according to the second embodiment of the method 300.
Figure 8:
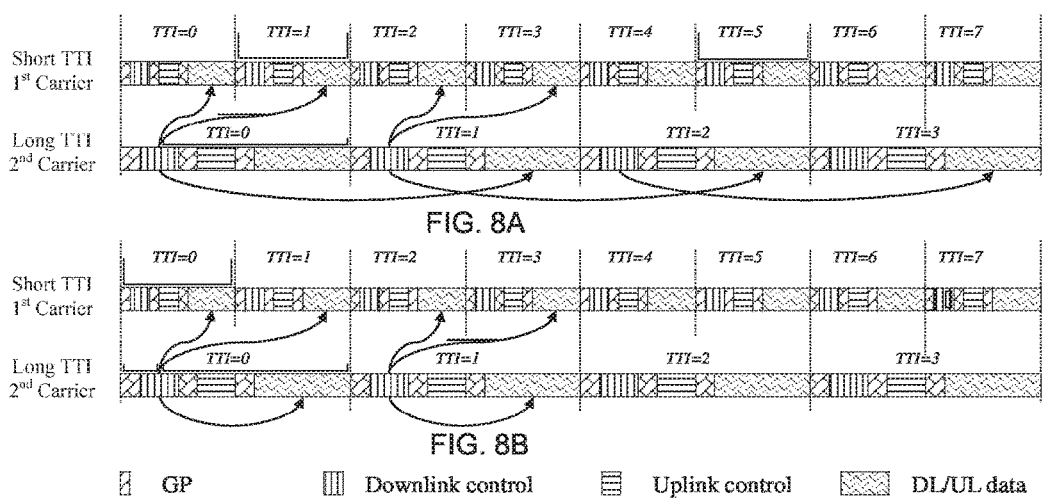
FIGS. 8A and 8B show two examples illustrating a relationship between scheduling grant transmission and data transmission with the frame structure as shown in FIG. 1, according to the third embodiment of the method 300.

FIG. 7 illustrates another example illustrating a relationship between DL scheduling and data transmission with the frame structure as shown in FIG. 2, according to the second embodiment of the method 300. Please note that this example is provided for the illustrative purpose only, but not for any limitation to the present disclosure. The only difference between FIGS. 6A and 6B and FIG. 7 lies in the usage of different frame structures. In FIG. 7, the DL scheduling and the data transmission present the same relationship as described above with reference to FIGS. 6A and 6B, which thus will not be detailed herein.

In a THIRD embodiment of the method 300, the base station may transmit, in the DL control region of a long TTI on the second carrier, a DL scheduling grant corresponding to data transmission on the first carrier and a DL scheduling grant corresponding to data transmission on the second carrier. In this embodiment, the DL data transmission on the second carrier is performed in the long TTI where the corresponding DL scheduling grant is transmitted or in a long TTI immediately following the long TTI where the corresponding DL scheduling grant is transmitted. Correspondingly, the DL data transmission on the first carrier is performed in a short TTI having an index $n_{short}$. The index $n_{short}$ and the index $n_{long}$ of the long TTI where the corresponding DL scheduling grant is transmitted have a relationship of $n_{long}=\text{floor}(n_{short}/2)$, wherein $n_{short}$ is an integer. Alternatively, the DL data transmission on the first carrier is performed in a short TTI having an index $n_{short}$. The index $n_{short}$ and the index $n_{long}$ of the long TTI where the corresponding DL scheduling grant is transmitted have a relationship of $n_{long}=\text{floor}((n_{short}-1)/2)$, wherein $n_{short}$ is an integer.

FIGS. 8A and 8B illustrate two examples illustrating a relationship between DL scheduling and data transmission with the frame structure as shown in FIG. 1, according to the third embodiment of the method 300. Please note that this example is provided for the illustrative purpose only, but not for any limitation to the present disclosure.

As illustrated in FIGS. 8A and 8B show, the base station may transmit the DL scheduling grant corresponding to DL transmission on the second carrier in the DL control region of a long TTI on the first carrier and transmits the DL scheduling grant corresponding to DL transmission on the first carrier also in the DL control region of the long TTI on the first carrier.

Corresponding to the scheduling, as illustrated in FIG. 8A, the DL data transmission on the second carrier is performed in a long TTI immediately following the long TTI where the DL scheduling grant corresponding to that DL data transmission on the second carrier is performed. The DL data transmission on the first carrier is performed in a short TTI having an index $n_{short}$. The index $n_{short}$ and the index $n_{long}$ of the long TTI where the DL scheduling grant corresponding to that DL data transmission on the first carrier is transmitted have a relationship of $n_{long}$=floor$(n_{short}/2)$, wherein $n_{short}$ is an integer.

In the example as shown in FIG. 8A, the base station transmits a DL scheduling grant corresponding to a DL data transmission on the second carrier in the DL control region of long TTI 0 and then performs the DL data transmission on the second carrier in the DL data transmission region of long TTI 1. Subsequently, the base station transmits another DL scheduling grant in the DL control region of long TTI 1 and then performs the DL data transmission on the second carrier in the DL data transmission region of long TTI 2, and so on. For the DL data transmission on the first carrier, the base station may transmit a DL scheduling grant in the DL control region of long TTI 0 and corresponding to this scheduling, perform the DL data transmission in the DL data transmission region of short TTI 0 and/or short TTI 1. Subsequently, the base station may transmit another DL scheduling grant in the DL control region of long TTI 1 and corresponding to this scheduling, perform the DL data transmission on the first carrier in the DL data transmission region of short TTI 2 and/or short TTI 3, and so on.

As an alternative, as illustrated in FIG. 8B, corresponding to the scheduling, the DL data transmission on the second carrier may be performed in the long TTI where the DL scheduling grant corresponding to that DL data transmission on the second carrier is transmitted. The DL data transmission on the first carrier is performed in a short TTI having an index $n_{short}$. The index $n_{short}$ and the index $n_{long}$ of the long TTI where the corresponding DL scheduling grant is transmitted have a relationship of $n_{long}$=floor$(n_{short}/2)$, wherein $n_{short}$ is an integer.

In the example as shown in FIG. 8B, the base station transmits a DL scheduling grant corresponding to DL data transmission on the second carrier in the DL control region of long TTI 0 and then performs the DL data transmission in the DL data transmission region of the long TTI 0. Subsequently, the base station transmits another DL scheduling grant in the DL control region of long TTI 1 and then performs the DL data transmission on the second carrier in the DL data transmission region of the same long TTI 1, and so on. For the DL data transmission on the first carrier, the base station may transmit a DL scheduling grant in the DL control region of long TTI 0 and corresponding to this scheduling, perform the DL data transmission on the first carrier in the DL data transmission region of short TTI 0 and/or short TTI 1. Subsequently, the base station may transmit another DL scheduling grant in the DL control region of long TTI 1 and corresponding to this scheduling, perform the DL data transmission on the first carrier in the DL data transmission region of short TTI 2 and/or short TTI 3, and so on.

Figure 9:
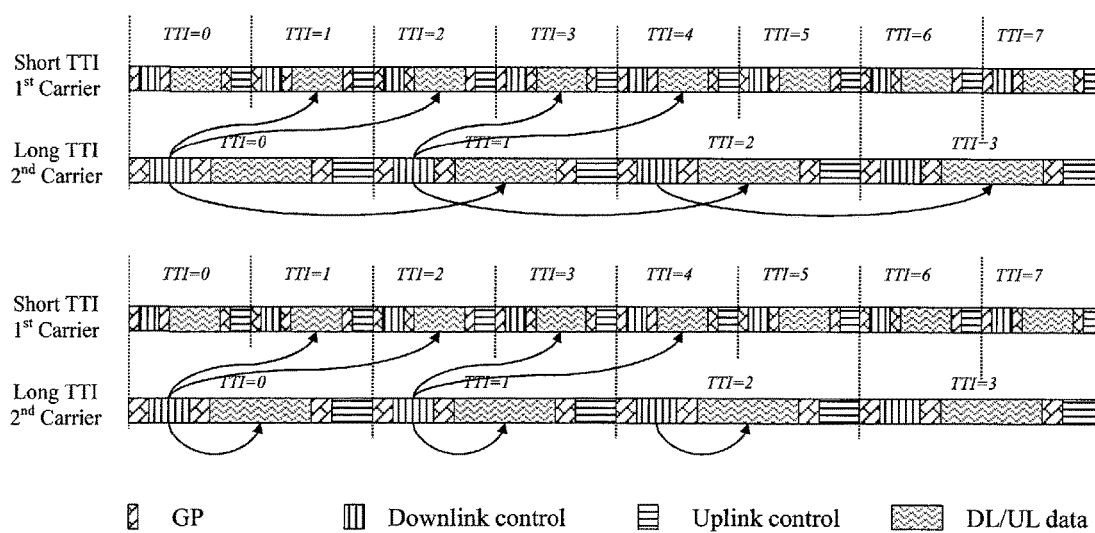
FIG. 9 shows another example illustrating a relationship between scheduling grant transmission and data transmission with the frame structure as shown in FIG. 2, according to the third embodiment of the method 300.

FIG. 9 illustrates another example illustrating a relationship between DL scheduling and data transmission with the frame structure as shown in FIG. 2, according to the third embodiment of the method 300. Please note that this example is provided for the illustrative purpose only, but not for any limitation to the present disclosure. The differences between FIG. 9 and FIGS. 8A and 8B lie in the usage of different frame structures and the DL data transmission on the first carrier.

The DL scheduling and the data transmission on the second carrier present the same relationship as described above with reference to FIGS. 8A and 8B, which thus will not be detailed herein. The following description will focus on the relationship between the DL scheduling and the data transmission on the first carrier only.

As illustrated in FIG. 9, the base station may transmit the DL scheduling grant corresponding to DL transmission on the first carrier in the DL control region of a long TTI having an index $n_{long}$.

Corresponding to the scheduling, the DL data transmission on the first carrier may be performed in a short TTI having an index $n_{short}$. The index $n_{short}$ and the index $n_{long}$ of the long TTI where the corresponding DL scheduling grant is transmitted have a relationship of $n_{long}$=floor$((n_{short}-1)/2)$, wherein $n_{short}$ is an integer.

For example, as shown in FIG. 9, the base station may transmit a DL scheduling grant corresponding to the DL data transmission on the first carrier in the DL control region of long TTI 0 on the second carrier and corresponding to this scheduling, perform the DL data transmission on the first carrier in the DL data transmission region of short TTI 1 and/or short TTI 2. Subsequently, the base station may transmit another DL scheduling grant in the DL control region of long TTI 1 on the second carrier and corresponding to this scheduling, perform the DL data transmission on the first carrier in the DL data transmission region of short TTI 3 and/or short TTI 4, and so on.

Figure 10:
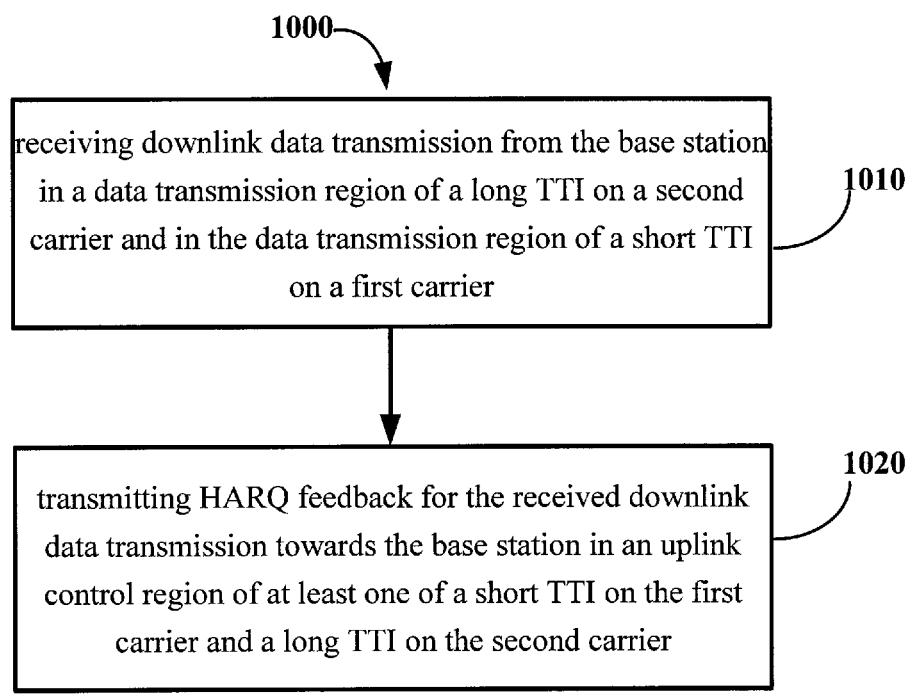
FIG. 10 illustrates a flowchart of a method 1000 for transmitting HARQ feedback according to some embodiments of the present disclosure.

FIG. 10 illustrates a flowchart of a method 1000 for transmitting HARQ feedback according to some embodiments of the present disclosure. The method 1000 is performed at a user equipment for transmitting HARQ feedback to a base station in a communications system supporting carrier aggregation of at least one component carrier (which will be referred to as "first carrier") on which a short TTI is applied and at least one component carrier (which will be referred to as "second carrier") on which a long TTI is applied. Each of the long TTI and the short TTI may comprise a DL control region, an UL control region and a data transmission region, but not necessarily in this order. As an example, the DL control region may be used by the user equipment to receive a DL scheduling grant or an UL scheduling grant from the base station. The UL control region may be used by the user equipment to transmit HARQ feedback for a DL data transmission. The data transmission region may be used by the user equipment to receive a DL data transmission from the base station.

As illustrated, the method 1000 starts at block 1010, in which the user equipment receives DL data transmission from the base station in a data transmission region of a short TTI on a first carrier and in the data transmission region of a long TTI on a second carrier.

At block 1020, the user equipment transmits HARQ feedback for the received DL data transmission towards the base station in the UL control region of a short TTI on the first carrier, or in the UL control region of a long TTI on the second carrier, or in the UL control regions of both the short TTI on the first carrier and the long TTI on the second carrier.

In a FIRST embodiment of the method 1000, the user equipment may transmit, on the first carrier, the HARQ feedback for the DL data transmission received on the first carrier in a short TTI immediately following or two short TTIs later than the short TTI where the DL data transmission is received.

Likewise, the user equipment may transmit, on the second carrier, the HARQ feedback for the DL data transmission received on the second carrier in a long TTI immediately following or two long TTIs later than the long TTI where the DL data transmission is received.

Figure 11:
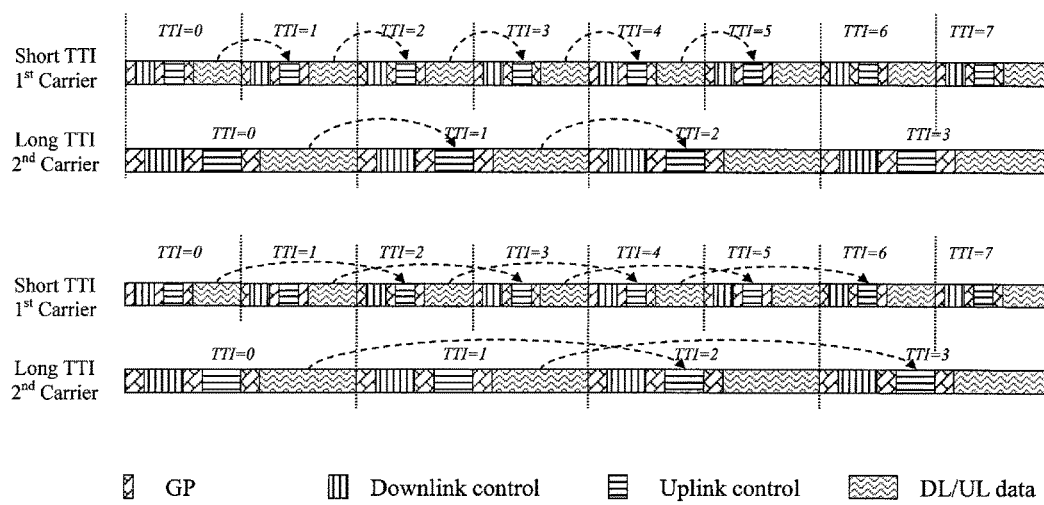
FIGS. 11A and 11B show two examples illustrating a relationship between DL data transmission and HARQ feedback transmission with the frame structure as shown in FIG. 1, according to the first embodiment of the method 1000.

FIGS. 11A and 11B show two examples illustrating a relationship between DL data transmission and HARQ feedback transmission with the frame structure as shown in FIG. 1, according to the first embodiment of the method 1000.

In the example as illustrated in FIG. 11A, the user equipment transmits HARQ feedback for a DL data transmission received on the first carrier in a short TTI immediately following the short TTI where the DL data transmission is received, and transmits HARQ feedback for a DL data transmission received on the second carrier in a long TTI immediately following the long TTI where the DL data transmission is received.

In particular, as shown, if the user equipment receives a DL data transmission on the first carrier from the base station in short TTI 0, then it may transmit HARQ feedback for the received DL data transmission in short TTI 1. Subsequently, if the user equipment receives a next DL data transmission on the first carrier from the base station in short TTI 1, then it may transmit HARQ feedback for the received DL data transmission in short TTI 2, and so on.

Likewise, if the user equipment receives a DL data transmission on the second carrier from the base station in long TTI 0, then it may transmit HARQ feedback for the received DL data transmission in long TTI 1. Subsequently, if the user equipment receives a next DL data transmission on the second carrier from the base station in long TTI 1, then it may transmit HARQ feedback for the received DL data transmission in long TTI 2, and so on.

In the example as illustrated in FIG. 11B, the user equipment transmits HARQ feedback for a DL data transmission received on the first carrier in a short TTI two that is short TTIs later than the TTI where the DL data transmission is received, and transmits HARQ feedback for a DL data transmission received on the second carrier in a long TTI that is two long TTIs later than the long TTI where the DL data transmission is received.

In particular, as shown, if the user equipment receives a DL data transmission on the first carrier from the base station in short TTI 0, then it may transmit HARQ feedback for the received DL data transmission in short TTI 2. Subsequently, if the user equipment receives a next DL data transmission on the first carrier from the base station in short TTI 1, then it may transmit HARQ feedback for the received DL data transmission in short TTI 3, and so on.

Likewise, if the user equipment receives a DL data transmission on the second carrier from the base station in long TTI 0, then it may transmit HARQ feedback for the received DL data transmission in long TTI 2. Subsequently, if the user equipment receives a next DL data transmission on the first carrier from the base station in long TTI 1, then it may transmit HARQ feedback for the received DL data transmission in long TTI 3, and so on.

In a SECOND embodiment of the method 1000, the user equipment may transmit the HARQ feedback on the first carrier for the DL data transmission received on the first carrier in a short TTI immediately following or two short TTIs later than the short TTI where the DL data transmission is received.

There are two alternative options as follows for transmitting HARQ feedback by the user equipment for the DL data transmission received on the second carrier:

The user equipment may transmit, on the first carrier, the HARQ feedback for the DL data transmission received on the second carrier in a short TTI whose index $n_{short}$ and the index $n_{long}$ of the long TTI where the DL data transmission is received have a relationship of $n_{short}=2*(n_{long}+1)+1$, wherein $n_{long}$ is an integer; or The user equipment may transmit, on the first carrier, the HARQ feedback for the DL data transmission received on the second carrier in a short TTI whose index $n_{short}$ and the index $n_{long}$ of the long TTI where the DL data transmission is received have a relationship of $n_{short}=2*(n_{long}+1)$, wherein $n_{long}$ is an integer.

Figure 12A:
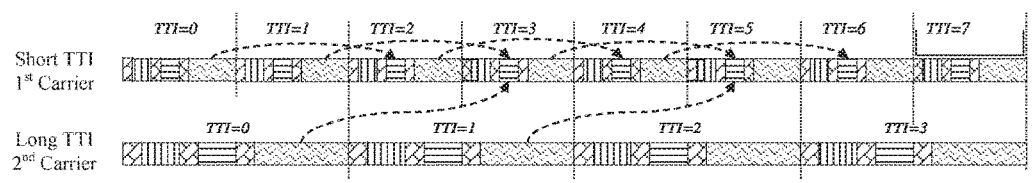
FIGS. 12A and 12B show two examples illustrating a relationship between DL data transmission and HARQ feedback transmission with the frame structure as shown in FIG. 1, according to the second embodiment of the method 1000.
Figure 12B:
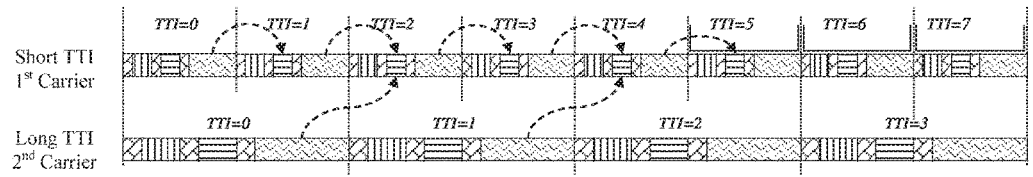

FIGS. 12A and 12B show two examples illustrating a relationship between DL data transmission and HARQ feedback transmission with the frame structure as shown in FIG. 1, according to the second embodiment of the method 1000.

In the example as illustrated in FIG. 12A, the user equipment transmits HARQ feedback for a DL data transmission received on the first carrier in a short TTI that is two short TTIs later than the short TTI where the DL data transmission is received, and transmits HARQ feedback for a DL data transmission received on the second carrier in a short TTI having an index $n_{short}$. The index $n_{short}$ and the index $n_{long}$ of the long TTI where the DL data transmission is received have a relationship of $n_{short}=2*(n_{long}+1)+1$, wherein $n_{long}$ is an integer.

In particular, as shown, if the user equipment receives a DL data transmission on the first carrier from the base station in short TTI 0, then it may transmit HARQ feedback for the received DL data transmission in short TTI 2. Subsequently, if the user equipment receives a next DL data transmission on the first carrier from the base station in short TTI 1, then it may transmit HARQ feedback for the received DL data transmission in short TTI 3, and so on.

For a DL data transmission on the second carrier, if the user equipment receives the DL data transmission on the second carrier from the base station in long TTI 0, then it may transmit HARQ feedback for the received DL data transmission in short TTI 3. Subsequently, if the user equipment receives a next DL data transmission on the second carrier from the base station in long TTI 1, then it may transmit HARQ feedback for the received DL data transmission in short TTI 5, and so on.

In the example as illustrated in FIG. 12B, the user equipment transmits HARQ feedback for a DL data transmission received on the first carrier in a short TTI immediately following the TTI where the DL data transmission is received, and transmits HARQ feedback for a DL data transmission received on the second carrier in a short TTI having an index $n_{short}$. The $n_{short}$ and the index $n_{long}$ of the long TTI where the DL data transmission is received have a relationship of $n_{short}=2*(n_{long}+1)$, wherein $n_{long}$ is an integer.

In particular, as shown, if the user equipment receives a DL data transmission on the first carrier from the base station in short TTI 0, then it may transmit HARQ feedback for the received DL data transmission in short TTI 1. Subsequently, if the user equipment receives a next DL data transmission on the first carrier from the base station in short TTI 1, then it may transmit HARQ feedback for the received DL data transmission in short TTI 2, and so on.

For a DL data transmission on the second carrier, if the user equipment receives a DL data transmission on the second carrier from the base station in long TTI 0, then it may transmit HARQ feedback for the received DL data transmission in short TTI 2. Subsequently, if the user equipment receives a next DL data transmission on the second carrier from the base station in long TTI 1, then it may transmit, on the first carrier, HARQ feedback for the received DL data transmission in short TTI 2, and so on.

In a THIRD embodiment of the method 1000, the user equipment may transmit, on the first carrier, the HARQ feedback for the DL data transmission received on the first carrier in the same short TTI as the one where the DL data transmission is received.

There are two alternative options as follows for transmitting HARQ feedback by the user equipment for the DL data transmission received on the second carrier:

The user equipment may transmit, on the second carrier, the HARQ feedback for the DL data transmission received on the second carrier in the long TTI where the DL data transmission is received; or The user equipment may transmit, on the first carrier, the HARQ feedback for the DL data transmission received on the second carrier in a short TTI having an index $n_{short}$. The index $n_{short}$ and the index $n_{long}$ of the long TTI where the DL data transmission is received have a relationship of $n_{short}=2*n_{long}+1$, wherein $n_{long}$ is an integer.

Figure 13:
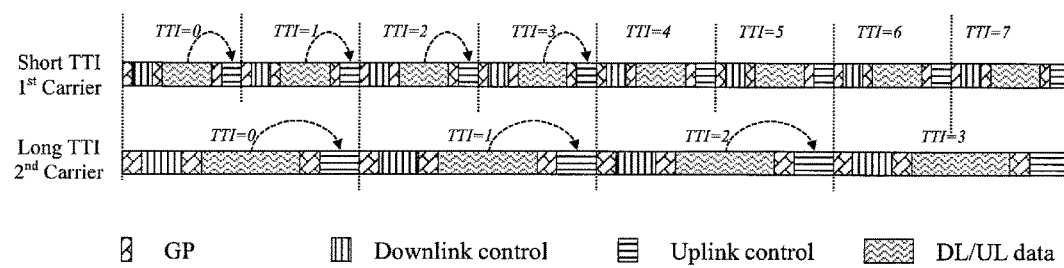
FIG. 13 shows an example illustrating a relationship between DL data transmission and HARQ feedback transmission with the frame structure as shown in FIG. 2, according to the third embodiment of the method 1000.

FIG. 13 shows an example illustrating a relationship between DL data transmission and HARQ feedback transmission with the frame structure as shown in FIG. 2, according to the third embodiment of the method 1000.

As illustrated in FIG. 13, the user equipment transmits HARQ feedback for a DL data transmission received on the first carrier in the same short TTI as the one where the DL data transmission is received, and transmits HARQ feedback for a DL data transmission received on the second carrier in the same long TTI as the one where the DL data transmission is received. In this way, a delay between the data transmission and the HARQ feedback can be minimized.

In particular, as shown, if the user equipment receives a DL data transmission on the first carrier from the base station in short TTI 0, then it may transmit HARQ feedback for the received DL data transmission in the same short TTI 0. Subsequently, if the user equipment receives a next DL data transmission on the first carrier from the base station in short TTI 1, then it may transmit HARQ feedback for the received DL data transmission in the same short TTI 1, and so on.

Likewise, if the user equipment receives a DL data transmission on the second carrier from the base station in long TTI 0, then it may transmit HARQ feedback for the received DL data transmission in the same long TTI 0. Subsequently, if the user equipment receives a next DL data transmission on the second carrier from the base station in long TTI 1, then it may transmit HARQ feedback for the received DL data transmission in the same long TTI 1, and so on.

Figure 14:
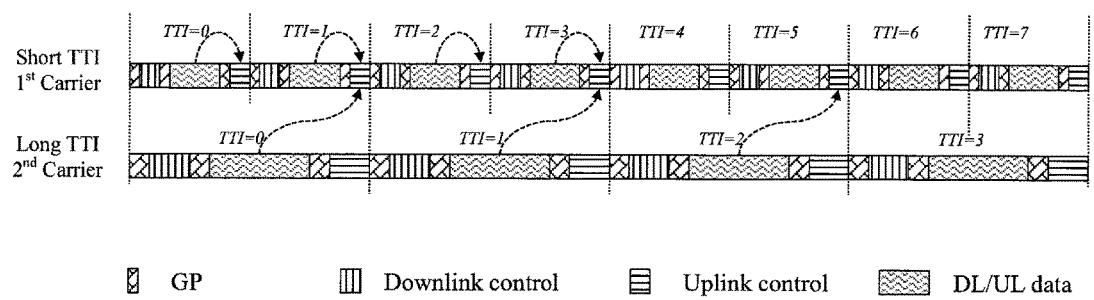
FIG. 14 shows another example illustrating a relationship between DL data transmission and HARQ feedback transmission with the frame structure as shown in FIG. 2, according to the third embodiment of the method 1000.

FIG. 14 shows another example illustrating a relationship between DL data transmission and HARQ feedback transmission with the frame structure as shown in FIG. 2, according to the third embodiment of the method 1000.

As illustrated, the user equipment transmits HARQ feedback for a DL data transmission received on the first carrier in the same short TTI as the one where the DL data transmission is received, and transmits, on the first carrier, HARQ feedback for a DL data transmission received on the second carrier in a short TTI having an index $n_{short}$. The index $n_{short}$ and the index $n_{long}$ of the long TTI where the DL data transmission is received have a relationship of $n_{short}=2*n_{long}+1$, wherein $n_{long}$ is an integer.

In particular, as shown, if the user equipment receives a DL data transmission on the first carrier from the base station in short TTI 0, then it may transmit HARQ feedback for the received DL data transmission in the same short TTI 0. Subsequently, if the user equipment receives a next DL data transmission on the first carrier from the base station in short TTI 1, then it may transmit HARQ feedback for the received DL data transmission in the same short TTI 1, and so on.

For a DL data transmission on the second carrier, if the user equipment receives the DL data transmission on the second carrier from the base station in long TTI 0, then it may transmit, on the first carrier, HARQ feedback for the received DL data transmission in short TTI 1. Subsequently, if the user equipment receives a next DL data transmission on the second carrier from the base station in long TTI 1, then it may transmit, on the first carrier, HARQ feedback for the received DL data transmission in short TTI 3, and so on.

In a FOURTH embodiment of the method 1000, the user equipment may transmit, on the second carrier, the HARQ feedback for the DL data transmission received on the second carrier in a long TTI immediately following or two long TTIs later than the long TTI where the DL data transmission is received, and transmits, on the second carrier, the HARQ feedback for the DL data transmission received on the first carrier in a long TTI whose index $n_{long}$ and the index $n_{short}$ of the short TTI where the DL data transmission is received have a relationship of $n_{long}=floor(n_{short}/2)+1$, wherein $n_{short}$ is an integer.

Figure 15A:
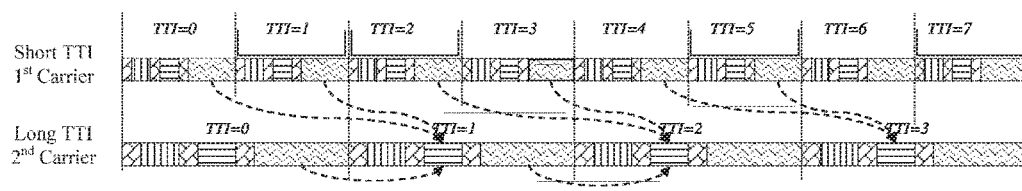
FIGS. 15A and 15B show two examples illustrating a relationship between DL data transmission and HARQ feedback transmission with the frame structure as shown in FIG. 1, according to the fourth embodiment of the method 1000.
Figure 15B:
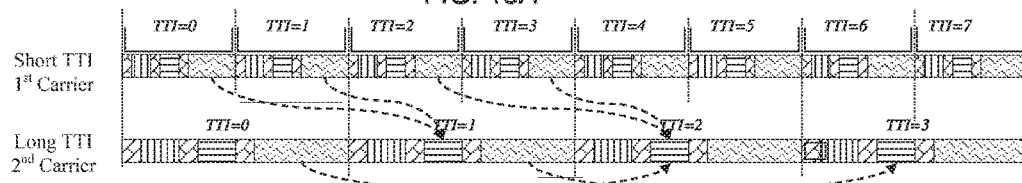

FIGS. 15A and 15B show two examples illustrating a relationship between DL data transmission and HARQ feedback transmission with the frame structure as shown in FIG. 1, according to the fourth embodiment of the method 1000.

In the example as illustrated in FIG. 15A, the user equipment transmits HARQ feedback for a DL data transmission received on the second carrier in a long TTI immediately following the long TTI where the DL data transmission is received, and transmits HARQ feedback for a DL data transmission received on the first carrier in a long TTI having an index $n_{long}$. The index $n_{long}$ and the index $n_{short}$ of the short TTI where the DL data transmission is received have a relationship of $n_{long}=floor(n_{short}/2)+1$, wherein $n_{long}$ is an integer.

In particular, as shown, if the user equipment receives a DL data transmission on the first carrier from the base station in short TTI 0 or TTI 1, then it may transmit HARQ feedback for the received DL data transmission in long TTI 1. Subsequently, if the user equipment receives a next DL data transmission on the first carrier from the base station in short TTI 2 or TTI 3, then it may transmit HARQ feedback for the received DL data transmission in long TTI 2, and so on.

As for a DL transmission on the second carrier, if the user equipment receives the DL data transmission on the second carrier from the base station in long TTI 0, then it may transmit HARQ feedback for the received DL data transmission in long TTI 1. Subsequently, if the user equipment receives a next DL data transmission on the second carrier from the base station in long TTI 1, then it may transmit HARQ feedback for the received DL data transmission in long TTI 2, and so on.

In the example as illustrated in FIG. 15B, the user equipment transmits, on the second carrier, HARQ feedback for a DL data transmission received on the second carrier in a long TTI that is two long TTIs later than the one where the DL data transmission is received, and transmits, on the second carrier, HARQ feedback for a DL data transmission received on the first carrier in a long TTI having an index $n_{long}$. The index $n_{long}$ and the index $n_{short}$ of the short TTI where the DL data transmission is received have a relationship of $n_{long}=\text{floor}(n_{short}/2)+1$, wherein $n_{long}$ is an integer.

In particular, as shown, if the user equipment receives a DL data transmission on the first carrier from the base station in short TTI 0 or short TTI 1, then it may transmit HARQ feedback for the received DL data transmission in long TTI 1. Subsequently, if the user equipment receives a next DL data transmission on the first carrier from the base station in short TTI 2 or TTI 3, then it may transmit HARQ feedback for the received DL data transmission in long TTI 2, and so on.

As for a DL data transmission on the second carrier, if the user equipment receives the DL data transmission on the second carrier from the base station in long TTI 0, then it may transmit, on the second carrier, HARQ feedback for the received DL data transmission in long TTI 2. Subsequently, if the user equipment receives a next DL data transmission on the second carrier from the base station in long TTI 1, then it may transmit, on the second carrier, HARQ feedback for the received DL data transmission in long TTI 3, and so on.

In a FIFTH embodiment of the method 1000, the user equipment may transmit, on the second carrier, the HARQ feedback for the DL data transmission received on the second carrier in the long TTI where the DL data transmission is received, and transmit, on the second carrier, the HARQ feedback for the DL data transmission received on the first carrier in a long TTI whose index $n_{long}$ and the index $n_{short}$ of the short TTI where the DL data transmission is received have a relationship of $n_{long}=\text{floor}((n_{short}-1)/2)+1$, wherein $n_{short}$ is an integer.

Figure 16:
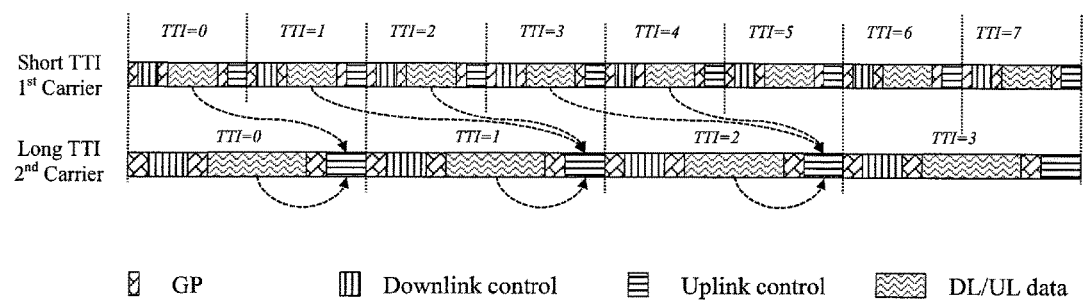
FIG. 16 shows an example illustrating a relationship between DL data transmission and HARQ feedback transmission with the frame structure as shown in FIG. 2, according to the fifth embodiment of the method 1000.

FIG. 16 shows an example illustrating a relationship between DL data transmission and HARQ feedback transmission with the frame structure as shown in FIG. 2, according to the fifth embodiment of the method 1000.

As illustrated, the user equipment transmits HARQ feedback for a DL data transmission received on the second carrier in the same long TTI as the one where the DL data transmission is received, and transmits HARQ feedback for a DL data transmission received on the first carrier in a long TTI having an index $n_{long}$. The index $n_{long}$ and the index $n_{short}$ of the short TTI where the DL data transmission is received have a relationship of $n_{long}=\text{floor}((n_{short}-1)/2)+1$, wherein $n_{long}$ is an integer.

In particular, as shown, if the user equipment receives a DL data transmission on the first carrier from the base station in short TTI 0, then it may transmit, on the second carrier, HARQ feedback for the received DL data transmission in long TTI 0. Subsequently, if the user equipment receives a next DL data transmission on the first carrier from the base station in short TTI 1 or TTI 2, then it may transmit, on the second carrier, HARQ feedback for the received DL data transmission in long TTI 1, and so on.

As for a DL data transmission on the second carrier, if the user equipment receives the DL data transmission on the second carrier from the base station in long TTI 0, then it may transmit HARQ feedback for the received DL data transmission in the same long TTI 0. Subsequently, if the user equipment receives a next DL data transmission on the second carrier from the base station in long TTI 1, then it may transmit HARQ feedback for the received DL data transmission in the same long TTI 1, and so on.

Please note that these examples as illustrated in FIGS. 11-16 are provided for the illustrative purpose only, but not for any limitation to the present disclosure.

Figure 17:
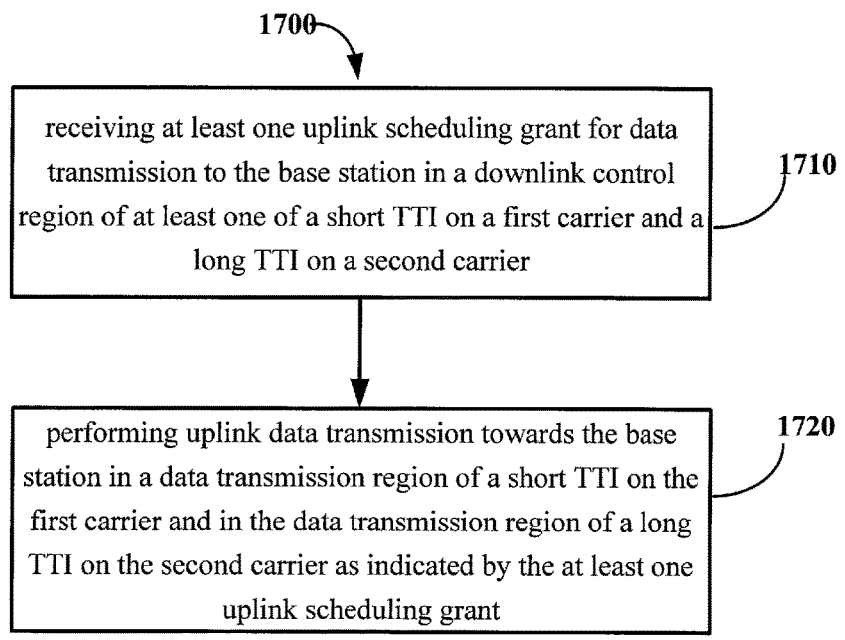
FIG. 17 illustrates a flowchart of a method 1700 for data transmission according to some embodiments of the present disclosure.

FIG. 17 illustrates a flowchart of a method 1700 for data transmission according to some embodiments of the present disclosure. The method 1700 is performed at a user equipment for performing data transmission to a base station in a wireless communications system supporting carrier aggregation of at least one component carrier (which will be referred to as "first carrier" hereafter) on which a short TTI is applied and at least one component carrier (which will be referred to as "second carrier" hereafter) on which a long TTI is applied. Each of the long TTI and the short TTI may comprise a DL control region, an UL control region and a data transmission region, but not necessarily in this order. As an example, the DL control region may be used by the user equipment to receive an UL scheduling grant. The UL control region may be used by the user equipment to transmit a HARQ feedback for a DL data transmission. The data transmission region may be used by the use equipment to transmit an UL data transmission according to the respective scheduling grant.

As illustrated, the method 1700 starts at block 1710, in which the user equipment receives at least one UL scheduling grant for data transmission to the base station in a DL control region of a short TTI on a first carrier, or in the DL control region of a long TTI on a second carrier, or in the DL control regions of both the short TTI on the first carrier and the long TTI on the second carrier.

At block 1720, the user equipment performs UL data transmission towards the base station in a data transmission region of a short TTI on the first carrier and in the data transmission region of a long TTI on the second carrier as indicated by the at least one UL scheduling grant.

In a FIRST embodiment of the method 1700, the user equipment may receive, in the DL control region of a short TTI on the first carrier, an UL scheduling grant for data transmission on the first carrier and receive, in the DL control region of a long TTI on the second carrier, an UL scheduling grant for data transmission on the second carrier. In this embodiment, the user equipment may perform the UL data transmission on the first carrier in a short TTI immediately following the short TTI where the corresponding UL scheduling grant is received, and perform the UL data transmission on the second carrier in a long TTI immediately following the long TTI where the corresponding UL scheduling grant is received.

Figure 18:
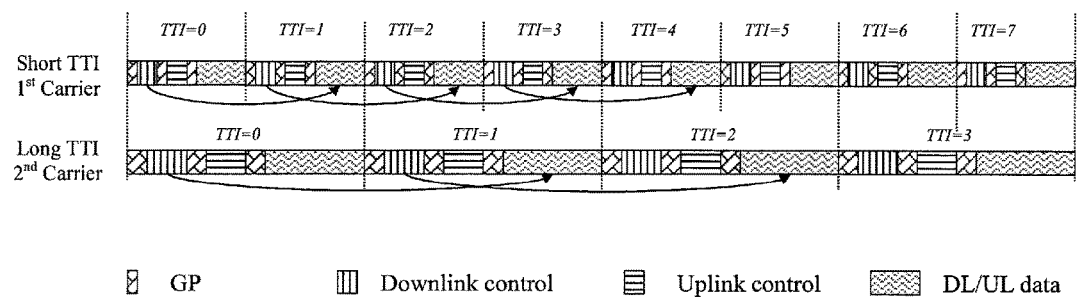
FIG. 18 shows an example illustrating a relationship between UL scheduling and UL data transmission with the frame structure as shown in FIG. 1, according to the first embodiment of the method 1700.

FIG. 18 shows an example illustrating a relationship between UL scheduling and UL data transmission with the frame structure as shown in FIG. 1, according to the first embodiment of the method 1700.

In this figure and following FIGS. 19-23, the icon  represents a guard period; the icon  represents a DL control region; the icon  represents an UL control region; and the icon  represents a data transmission region used for DL or UL data transmission. A sequence of TTIs indicates the timing for transmission between the base station and the user equipment. Also, the curved arrows shown in the figure indicate a relationship between UL scheduling and UL data transmission.

As illustrated in FIG. 18, if the user equipment receives an UL scheduling grant for the UL data transmission on the first carrier in short TTI 0, then it may perform the UL data transmission on the first carrier in short TTI 1. Subsequently, if the user equipment receives an UL scheduling grant for the UL data transmission on the first carrier in short TTI 1, then it may perform the UL data transmission on the first carrier in short TTI 2, and so on.

Likewise, if the user equipment receives an UL scheduling grant for the UL data transmission on the second carrier in long TTI 0, then it may perform the UL data transmission on the second carrier in long TTI 1. Subsequently, if the user equipment receives an UL scheduling grant for the UL data transmission on the second carrier in long TTI 1, then it may perform the UL data transmission on the second carrier in long TTI 2.

Figure 19:
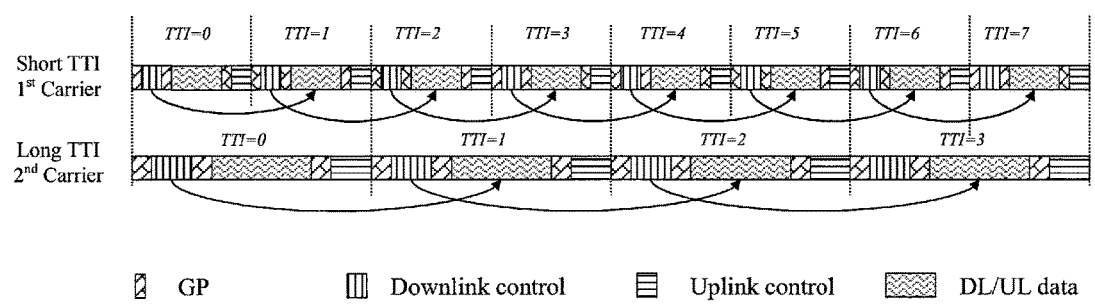
FIG. 19 shows another example illustrating a relationship between UL scheduling and UL data transmission with the frame structure as shown in FIG. 2, according to the first embodiment of the method 1700.

FIG. 19 shows another example illustrating a relationship between UL scheduling and UL data transmission with the frame structure as shown in FIG. 2, according to the first embodiment of the method 1700. The only difference between FIG. 18 and FIG. 19 lies in the usage of different frame structures. In FIG. 19, the UL scheduling and the UL data transmission present the same relationship as described above with reference to FIG. 18, which thus will not be detailed herein.

In a SECOND embodiment of the method 1700, the user equipment may receive, in the DL control region of a short TTI on the first carrier, an UL scheduling grant for data transmission on the first carrier and receiving, also in the DL control region of a short TTI on the first carrier, an UL scheduling grant for data transmission on the second carrier. Generally, the user equipment may receive the UL scheduling grant for the UL transmission on the first carrier in each short TTI, and receive the UL scheduling grant for the UL transmission on the second carrier in every two or more short TTIs, depending on a ratio of the length of the short TTI to the length of the long TTI.

According to the received UL scheduling grants, the user equipment may perform the UL data transmission on the first carrier in a short TTI immediately following the one where the corresponding UL scheduling grant is received. Also, the user equipment may perform the UL data transmission on the second carrier in a long TTI having an index $n_{long}$. The index $n_{long}$ and the index $n_{short}$ of the short TTI where the corresponding UL scheduling grant is received have a relationship of $n_{long}=n_{short}/2$, wherein $n_{short}$ is an even integer. Alternatively, the index $n_{long}$ and the index $n_{short}$ of the short TTI where the corresponding UL scheduling grant is received have a relationship of $n_{long}=1+n_{short}/2$, wherein $n_{short}$ is an even integer.

Figure 20A:
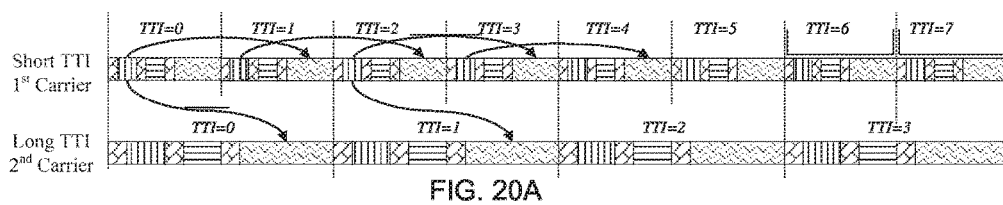
FIGS. 20A and 20B show two examples illustrating a relationship between UL scheduling and UL data transmission with the frame structure as shown in FIG. 1, according to the second embodiment of the method 1700.
Figure 20B:
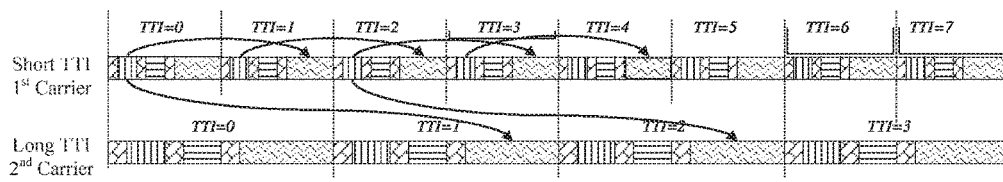

FIGS. 20A and 20B show two examples illustrating a relationship between UL scheduling and UL data transmission with the frame structure as shown in FIG. 1, according to the second embodiment of the method 1700.

As illustrated, if the user equipment receives an UL scheduling grant for the UL data transmission on the first carrier in short TTI 0, then it performs the UL data transmission on the first carrier in short TTI 1. Subsequently, if the user equipment receives an UL scheduling grant for the UL data transmission on the first carrier in short TTI 1, then it performs the UL data transmission on the first carrier in short TTI 2, and so on.

As for an UL data transmission on the second carrier, in the example of FIG. 20A, if the user equipment receives an UL scheduling grant for the UL data transmission on the second carrier in short TTI 0, then it performs the UL data transmission on the second carrier in long TTI 0. Subsequently, if the user equipment receives an UL scheduling grant for the UL data transmission on the second carrier in short TTI 2, then it performs the UL data transmission on the second carrier in long TTI 1.

In the example of FIG. 20B, if the user equipment receives an UL scheduling grant for the UL data transmission on the second carrier in short TTI 0, then it performs the UL data transmission on the second carrier in long TTI 1. Subsequently, if the user equipment receives an UL scheduling grant for the UL data transmission on the second carrier in short TTI 2, then it performs the UL data transmission on the second carrier in long TTI 2.

Figure 21:
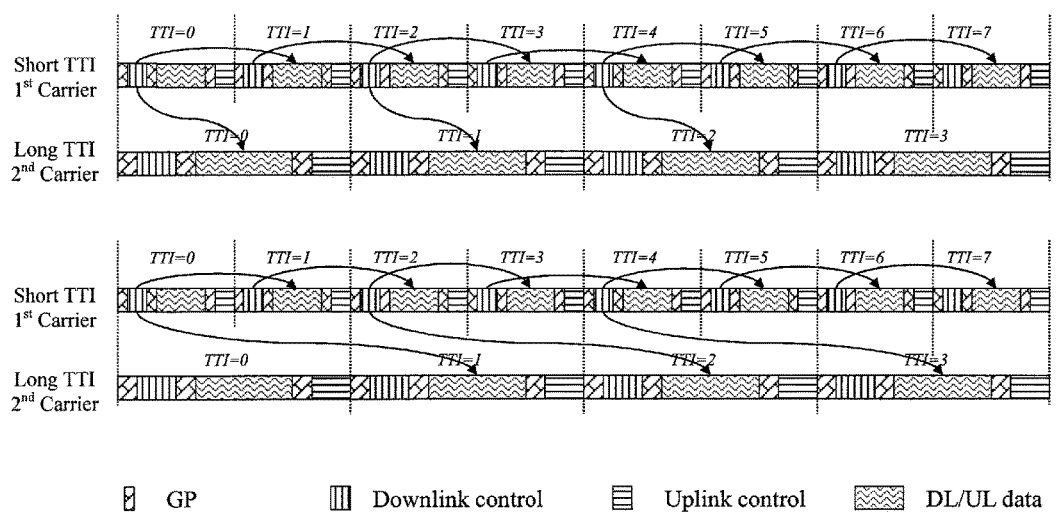
FIG. 21 shows another example illustrating a relationship between UL scheduling and UL data transmission with the frame structure as shown in FIG. 2, according to the second embodiment of the method 1700.

FIG. 21 shows another example illustrating a relationship between UL scheduling and UL data transmission with the frame structure as shown in FIG. 2, according to the second embodiment of the method 1700. The only difference between FIGS. 20A and 20B and FIG. 21 lies in the usage of different frame structures. In FIG. 21, the UL scheduling and the UL data transmission present the same relationship as described above with reference to FIGS. 20A and 20B, which thus will not be detailed herein.

In a THIRD embodiment of the method 1700, the user equipment may receive, in the DL control region of a long TTI on the second carrier, both an UL scheduling grant for UL data transmission on the first carrier and an UL scheduling grant for UL data transmission on the second carrier. According to the received scheduling grants, the user equipment may perform the UL data transmission on the first carrier in a short TTI having an index $n_{short}$. The index $n_{short}$ and the index $n_{long}$ of the long TTI where the corresponding UL scheduling grant is received have a relationship of $n_{long}=\text{floor}((n_{short}-1)/2)$, wherein $n_{long}$ is an integer. Also, the user equipment may perform the UL data transmission on the second carrier in a long TTI immediately following the long TTI where the corresponding UL scheduling grant is received.

Figure 22:
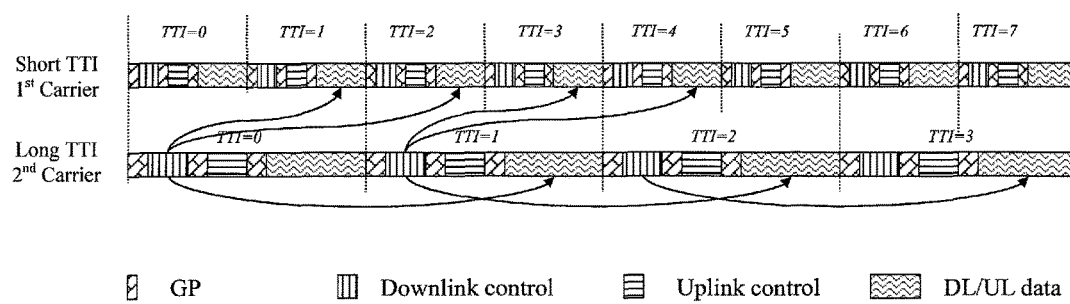
FIG. 22 shows an example illustrating a relationship between UL scheduling and UL data transmission with the frame structure as shown in FIG. 1, according to the third embodiment of the method 1700.

FIG. 22 shows an example illustrating a relationship between UL scheduling and UL data transmission with the frame structure as shown in FIG. 1, according to the third embodiment of the method 1700.

As illustrated, if the user equipment receives an UL scheduling grant for the UL data transmission on the first carrier in long TTI 0 as well as an UL scheduling grant for the UL data transmission on the second carrier in long TTI 0, then it may perform the UL data transmission on the first carrier in short TTI 1 and/or short TTI 2, and perform the UL data transmission on the second carrier in long TTI 1. Subsequently, if the user equipment receives another UL scheduling grant for the UL data transmission on the first carrier in long TTI 1, then it may perform the UL data transmission on the first carrier in short TTI 3 and/or short TTI 4, and perform the UL data transmission on the second carrier in long TTI 2, and so on.

Figure 23:
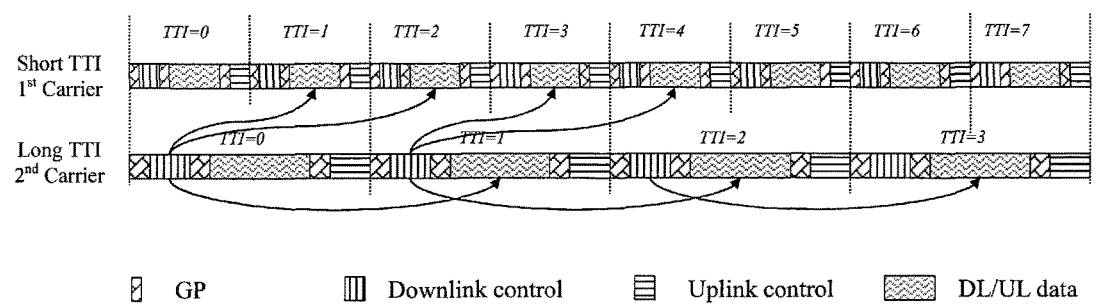
FIG. 23 shows another example illustrating a relationship between UL scheduling and UL data transmission with the frame structure as shown in FIG. 2, according to the third embodiment of the method 1700.

FIG. 23 shows another example illustrating a relationship between UL scheduling and UL data transmission with the frame structure as shown in FIG. 2, according to the third embodiment of the method 1700. The only difference between FIG. 23 and FIG. 22 lies in the usage of different frame structures. In FIG. 23, the UL scheduling and the UL data transmission present the same relationship as described above with reference to FIG. 22, which thus will not be detailed herein.

Please note that these example as illustrated in FIGS. 18-23 are provided for the illustrative purpose only, but not for any limitation to the present disclosure.

Figure 24:
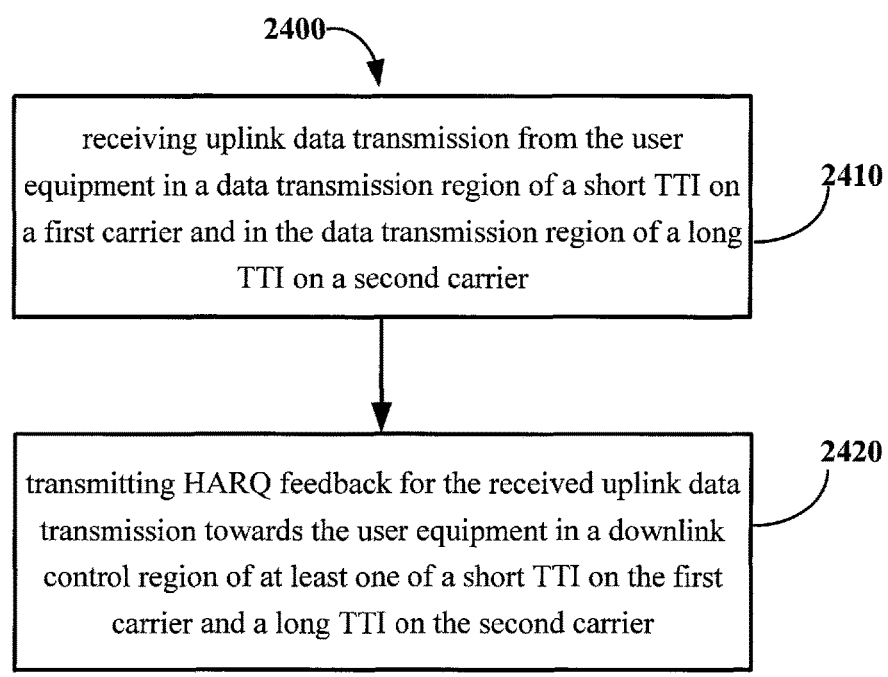
FIG. 24 illustrates a flowchart of a method 2400 for transmitting HARQ feedback according to some embodiments of the present disclosure.

FIG. 24 illustrates a flowchart of a method 2400 for transmitting HARQ feedback according to some embodiments of the present disclosure. The method 2400 is performed at a base station for transmitting HARQ feedback for UL data transmission to a user equipment in a communications system supporting carrier aggregation of at least one component carrier (which will be referred to as "first carrier") on which a short TTI is applied and at least one component carrier (which will be referred to as "second carrier") on which a long TTI is applied. Each of the long TTI and the short TTI may comprise a DL control region, an UL control region and a data transmission region, but not necessarily in this order. As an example, the DL control region may be used by the base station to transmit HARQ feedback to the user equipment. The data transmission region may be used by the user equipment to transmit UL data transmission to the base station.

As illustrated, the method 2400 starts at block 2410, in which the base station receives UL data transmission from the user equipment in a data transmission region of a short TTI on a first carrier and in the data transmission region of a long TTI on a second carrier.

At block 2420, the base station transmits HARQ feedback for the received UL data transmission towards the user equipment in a DL control region of a short TTI on the first carrier, or in the DL control region of a long TTI on the second carrier, or in the DL control regions of both the short TTI on the first carrier and the long TTI on the second carrier.

In a FIRST embodiment of the method 2400, the base station may transmit, on the first carrier, the HARQ feedback for the UL data transmission received on the first carrier in a short TTI immediately following or two short TTIs later than the short TTI where the UL data transmission is received. Likewise, the base station may also transmit, on the second carrier, the HARQ feedback for the UL data transmission received on the second carrier in a long TTI immediately following or two long TTIs later than the long TTI where the UL data transmission is received.

Figure 25:
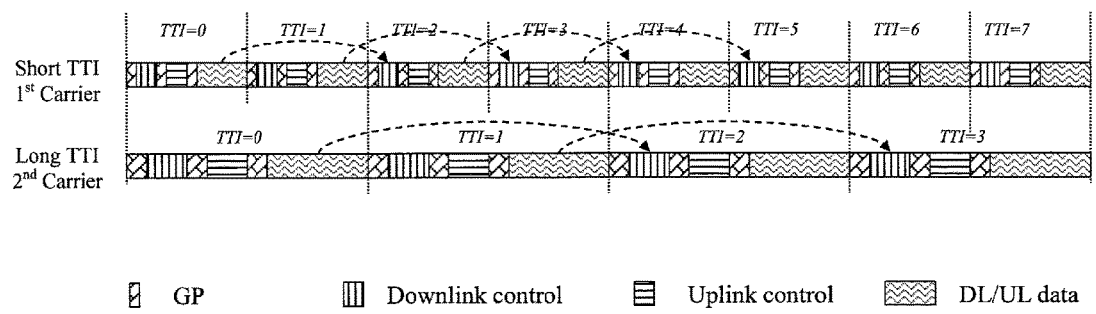
FIG. 25 shows an example illustrating a relationship between UL data transmission and HARQ feedback transmission with the frame structure as shown in FIG. 1, according to the first embodiment of the method 2400.

FIG. 25 shows an example illustrating a relationship between UL data transmission and HARQ feedback transmission with the frame structure as shown in FIG. 1, according to the first embodiment of the method 2400.

As illustrated, the base station may transmit, on the first carrier, the HARQ feedback for the UL data transmission received on the first carrier in a short TTI that is two short TTIs later than the short TTI where the UL data transmission is received and may also transmit, on the second carrier, the HARQ feedback for the UL data transmission received on the second carrier in a long TTI that is two long TTIs later than the long TTI where the UL data transmission is received.

In particular, as shown, if the base station receives an UL data transmission on the first carrier in short TTI 0, then it may transmit HARQ feedback for the UL data transmission on the first carrier in short TTI 2. Subsequently, if the base station receives an UL data transmission on the first carrier in short TTI 1, then it may transmit HARQ feedback for the UL data transmission on the first carrier in short TTI 3. As for an UL data transmission on the second carrier, if the base station receives the UL data transmission on the second carrier in long TTI 0, then it may transmit HARQ feedback for the UL data transmission on the second carrier in long TTI 2. Subsequently, if the base station receives the UL data transmission on the second carrier in long TTI 1, then it may transmit HARQ feedback for the UL data transmission on the second carrier in long TTI 3.

Figure 26A:
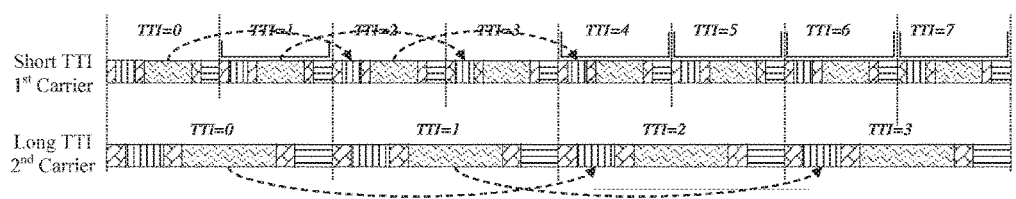
FIGS. 26A and 26B show two other examples illustrating a relationship between UL data transmission and HARQ feedback transmission with the frame structure as shown in FIG. 2, according to the first embodiment of the method 2400.
Figure 26B:
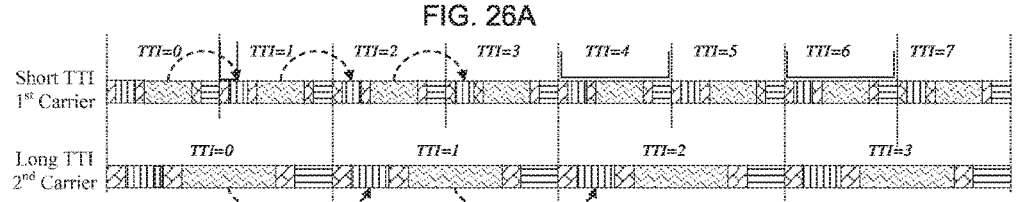

FIGS. 26A and 26B show two other examples illustrating a relationship between UL data transmission and HARQ feedback transmission with the frame structure as shown in FIG. 2, according to the first embodiment of the method 2400.

As illustrated, the base station may transmit, on the first carrier, the HARQ feedback for the UL data transmission received on the first carrier in a short TTI that is immediately following or two short TTIs later than the short TTI where the UL data transmission is received and may also transmit, on the second carrier, the HARQ feedback for the UL data transmission received on the second carrier in a long TTI that is immediately following or two long TTIs later than the long TTI where the UL data transmission is received.

In the example as shown in FIG. 26A, if the base station receives an UL data transmission on the first carrier in short TTI 0, then it may transmit HARQ feedback for the UL data transmission on the first carrier in short TTI 2. Subsequently, if the base station receives an UL data transmission on the first carrier in short TTI 1, then it may transmit HARQ feedback for the UL data transmission on the first carrier in short TTI 3. As for an UL data transmission on the second carrier, if the base station receives the UL data transmission in long TTI 0, then it may transmit HARQ feedback for the UL data transmission on the second carrier in long TTI 2. Subsequently, if the base station receives the UL data transmission in long TTI 1, then it may transmit HARQ feedback for the UL data transmission on the second carrier in long TTI 3.

In the example as shown in FIG. 26B, if the base station receives an UL data transmission on the first carrier in short TTI 0, then it may transmit HARQ feedback for the UL data transmission on the first carrier in short TTI 1. Subsequently, if the base station receives an UL data transmission on the first carrier in short TTI 1, then it may transmit HARQ feedback for the UL data transmission on the first carrier in short TTI 2. As for an UL data transmission on the second carrier, if the base station receives the UL data transmission in long TTI 0, then it may transmit HARQ feedback for the UL data transmission on the second carrier in long TTI 1. Subsequently, if the base station receives the UL data transmission in long TTI 1, then it may transmit HARQ feedback for the UL data transmission on the second carrier in long TTI 2.

In a SECOND embodiment of the method 2400, the base station may transmit, on the first carrier, the HARQ feedback for the UL data transmission received on the first carrier in a short TTI immediately following or two short TTIs later than the short TTI where the UL data transmission is received.

There are two alternative options as follows for transmitting the HARQ feedback on the first carrier for the UL data transmission received on the second carrier:

The base station may transmit the HARQ feedback in a short TTI whose index $n_{short}$ and the index $n_{long}$ of the long TTI where the UL data transmission is received have a relationship of $n_{short}=2*(n_{long}+1)+1$, wherein $n_{long}$ is an integer; or The base station may transmit the HARQ feedback in a short TTI whose index $n_{short}$ and the index $n_{long}$ of the long TTI where the UL data transmission is received have a relationship of $n_{short}=2*(n_{long}+1)$, wherein $n_{long}$ is an integer.

Figure 27:
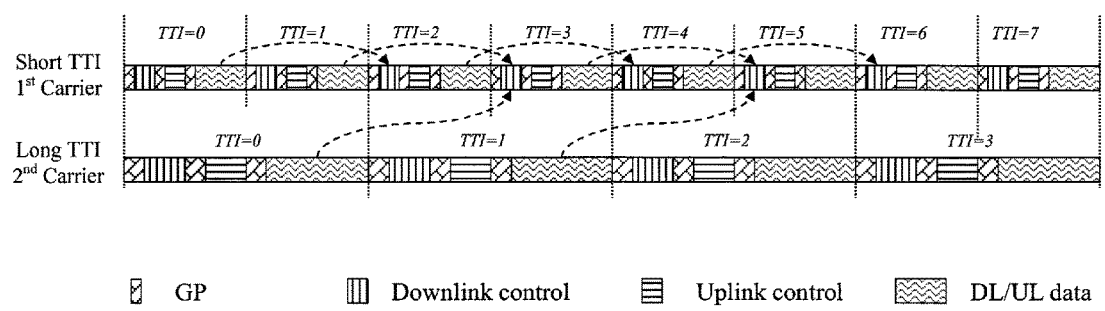
FIG. 27 shows an example illustrating a relationship between UL data transmission and HARQ feedback transmission with the frame structure as shown in FIG. 1, according to the second embodiment of the method 2400.

FIG. 27 shows an example illustrating a relationship between UL data transmission and HARQ feedback transmission with the frame structure as shown in FIG. 1, according to the second embodiment of the method 2400.

As illustrated, the base station may transmit, on the first carrier, the HARQ feedback for the UL data transmission received on the first carrier in a short TTI that is two short TTIs later than the short TTI where the UL data transmission is received and may transmit, on the first carrier, the HARQ feedback for the UL data transmission received on the second carrier in a short TTI having an index $n_{short}$. The index $n_{short}$ and the index $n_{long}$ of the long TTI where the UL data transmission is received have a relationship of $n_{short}=2*(n_{long}+1)+1$, wherein $n_{long}$ is an integer.

In particular, as shown, if the base station receives an UL data transmission on the first carrier in short TTI 0, then it may transmit HARQ feedback for the UL data transmission on the first carrier in short TTI 2. Subsequently, if the base station receives an UL data transmission on the first carrier in short TTI 1, then it may transmit HARQ feedback for the UL data transmission on the first carrier in short TTI 3. As for an UL data transmission on the second carrier, if the base station receives the UL data transmission in long TTI 0, then it may transmit HARQ feedback for the UL data transmission on the first carrier in short TTI 3. Subsequently, if the base station receives the UL data transmission in long TTI 1, then it may transmit HARQ feedback for the UL data transmission on the first carrier in long TTI 5.

Figure 28A:
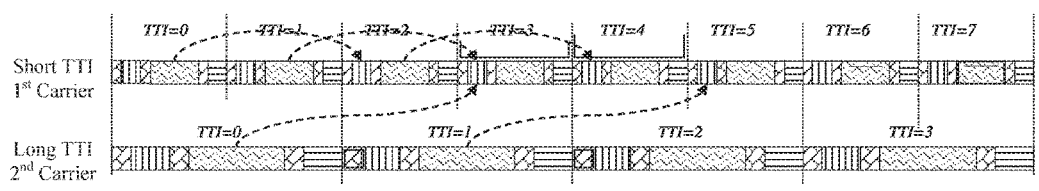
FIGS. 28A and 28B show two other examples illustrating a relationship between UL data transmission and HARQ feedback transmission with the frame structure as shown in FIG. 2, according to the first embodiment of the method 2400.
Figure 28B:
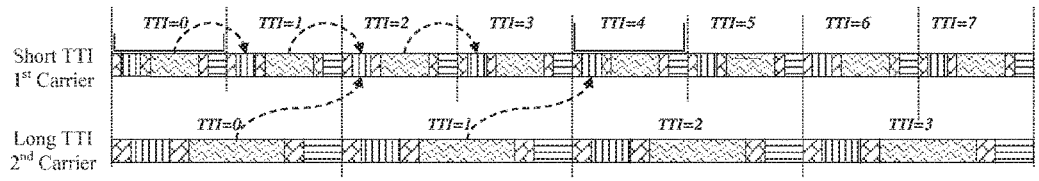

FIGS. 28A and 28B show two other examples illustrating a relationship between UL data transmission and HARQ feedback transmission with the frame structure as shown in FIG. 2, according to the second embodiment of the method 2400.

As illustrated, the base station may transmit, on the first carrier, the HARQ feedback for the UL data transmission received on the first carrier in a short TTI that is immediately following or two short TTIs later than the short TTI where the UL data transmission is received and may transmit, on the first carrier, the HARQ feedback for the UL data transmission received on the second carrier in a short TTI having an index $n_{short}$. The index $n_{short}$ and the index $n_{long}$ of the long TTI where the UL data transmission is received have a relationship of $n_{short}=2*(n_{long}+1)+1$, wherein $n_{long}$ is an integer, or have a relationship of $n_{short}=2*(n_{long}+1)$, wherein $n_{long}$ is an integer.

In the example as shown in FIG. 28A, if the base station receives an UL data transmission on the first carrier in short TTI 0, then it may transmit HARQ feedback for the UL data transmission on the first carrier in short TTI 2. Subsequently, if the base station receives an UL data transmission on the first carrier in short TTI 1, then it may transmit HARQ feedback for the UL data transmission on the first carrier in short TTI 3. As for an UL data transmission on the second carrier, if the base station receives the UL data transmission in long TTI 0, then it may transmit HARQ feedback for the UL data transmission on the first carrier in short TTI 3. Subsequently, if the base station receives the UL data transmission in long TTI 1, then it may transmit HARQ feedback for the UL data transmission on the first carrier in short TTI 5.

In the example as shown in FIG. 28B, if the base station receives an UL data transmission on the first carrier in short TTI 0, then it may transmit HARQ feedback for the UL data transmission on the first carrier in short TTI 1. Subsequently, if the base station receives an UL data transmission on the first carrier in short TTI 1, then it may transmit HARQ feedback for the UL data transmission on the first carrier in short TTI 2. As for an UL data transmission on the second carrier, if the base station receives the UL data transmission in long TTI 0, then it may transmit HARQ feedback for the UL data transmission on the first carrier in short TTI 2.

Subsequently, if the base station receives the UL data transmission in long TTI 1, then it may transmit HARQ feedback for the UL data transmission on the first carrier in short TTI 4.

In a THIRD embodiment of the method 2400, the base station may transmit, on the second carrier, the HARQ feedback for the UL data transmission received on the second carrier in a long TTI immediately following or two long TTIs later than the long TTI where the UL data transmission is received.

There are two alternative options as follows for transmitting the HARQ feedback on the second carrier for the UL data transmission received on the first carrier:

The base station may transmit the HARQ feedback in a long TTI whose index $n_{long}$ and the index $n_{short}$ of the short TTI where the UL data transmission is received have a relationship of $n_{long}=floor((n_{short}+1)/2)+1$, wherein $n_{short}$ is an integer; or The base station may transmit the HARQ feedback in a long TTI whose index $n_{long}$ and the index $n_{short}$ of the short TTI where the UL data transmission is received have a relationship of $n_{long}=floor(n_{short}/2)+1$, wherein $n_{short}$ is an integer.

Figure 29:
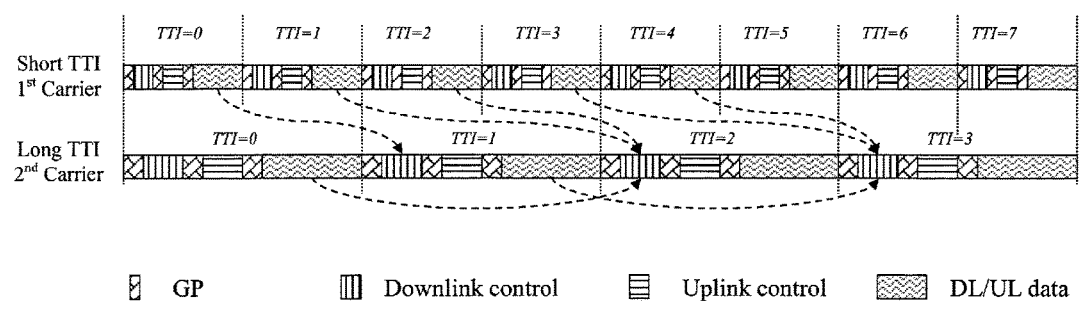
FIG. 29 shows an example illustrating a relationship between UL data transmission and HARQ feedback transmission with the frame structure as shown in FIG. 1, according to the third embodiment of the method 2400.

FIG. 29 shows an example illustrating a relationship between UL data transmission and HARQ feedback transmission with the frame structure as shown in FIG. 1, according to the third embodiment of the method 2400.

As illustrated, the base station may transmit, on the second carrier, the HARQ feedback for the UL data transmission received on the second carrier in a long TTI that is two long TTIs later than the one where the UL data transmission is received and may transmit, on the second carrier, the HARQ feedback for the UL data transmission received on the first carrier in a long TTI having an index $n_{long}$. The index $n_{long}$ and the index $n_{short}$ of the short TTI where the UL data transmission is received have a relationship of $n_{long}=floor((n_{short}+1)/2)+1$, wherein $n_{short}$ is an integer.

In particular, as shown, if the base station receives an UL data transmission on the first carrier in short TTI 0, then it may transmit HARQ feedback for the UL data transmission on the second carrier in long TTI 1. Subsequently, if the base station receives an UL data transmission on the first carrier in short TTI 1 or short TTI 2, then it may transmit HARQ feedback for the UL data transmission on the second carrier in long TTI 2. As for an UL data transmission on the second carrier, if the base station receives the UL data transmission in long TTI 0, then it may transmit HARQ feedback for the UL data transmission on the second carrier in long TTI 2. Subsequently, if the base station receives the UL data transmission on the second carrier in long TTI 1, then it may transmit HARQ feedback for the UL data transmission on the second carrier in long TTI 3.

Figure 30A:
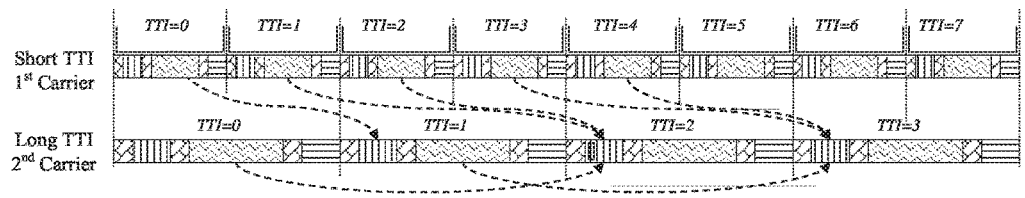
FIGS. 30A and 30B show two other examples illustrating a relationship between UL data transmission and HARQ feedback transmission with the frame structure as shown in FIG. 2, according to the first embodiment of the method 2400.
Figure 30B:
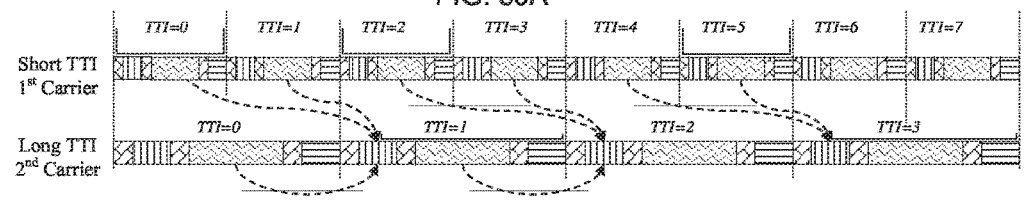

FIGS. 30A and 30B show two other examples illustrating a relationship between UL data transmission and HARQ feedback transmission with the frame structure as shown in FIG. 2, according to the first embodiment of the method 2400.

As illustrated, the base station may transmit, on the second carrier, the HARQ feedback for the UL data transmission received on the second carrier in a long TTI that is immediately following or two long TTIs later than the one where the UL data transmission is received and may transmit, on the second carrier, the HARQ feedback for the UL data transmission received on the first carrier in a long TTI having an index $n_{long}$. The index $n_{long}$ and the index $n_{short}$ of the short TTI where the UL data transmission is received have a relationship of $n_{long}=\text{floor}((n_{short}+1)/2)+1$, wherein $n_{short}$ is an integer, or have a relationship of $n_{long}=\text{floor}(n_{short}/2)+1$, wherein $n_{short}$ is an integer.

In the example as shown in FIG. 30A, if the base station receives an UL data transmission on the first carrier in short TTI 0, then it may transmit HARQ feedback for the UL data transmission on the second carrier in long TTI 1. Subsequently, if the base station receives an UL data transmission on the first carrier in short TTI 1 or short TTI 2, then it may transmit HARQ feedback for the UL data transmission on the second carrier in long TTI 2. As for an UL data transmission on the second carrier, if the base station receives the UL data transmission in long TTI 0, then it may transmit HARQ feedback for the UL data transmission on the second carrier in long TTI 2. Subsequently, if the base station receives the UL data transmission on the second carrier in long TTI 1, then it may transmit HARQ feedback for the UL data transmission on the second carrier in long TTI 3.

In the example as shown in FIG. 30B, if the base station receives an UL data transmission on the first carrier in short TTI 0 or short TTI 1, then it may transmit HARQ feedback for the UL data transmission on the second carrier in long TTI 1. Subsequently, if the base station receives an UL data transmission on the first carrier in short TTI 2 or short TTI 3, then it may transmit HARQ feedback for the UL data transmission on the second carrier in long TTI 2. As for an UL data transmission on the second carrier, if the base station receives the UL data transmission in long TTI 0, then it may transmit HARQ feedback for the UL data transmission on the second carrier in long TTI 1. Subsequently, if the base station receives the UL data transmission in long TTI 1, then it may transmit HARQ feedback for the UL data transmission on the second carrier in long TTI 2.

Please note that these example as illustrated in FIGS. 25-30 are provided for the illustrative purpose only, but not for any limitation to the present disclosure.

Figure 31:
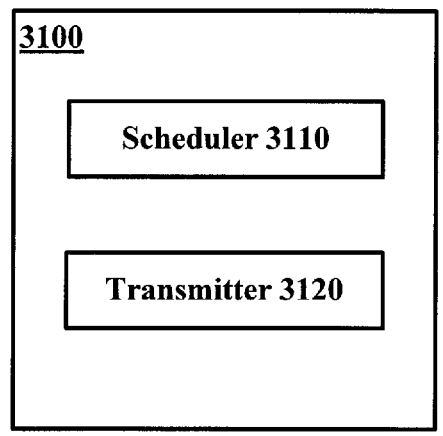
FIG. 31 illustrates a schematic block diagram of an apparatus 3100 for performing data transmission to a user equipment according to some embodiments of the present disclosure.

FIG. 31 illustrates a schematic block diagram of an apparatus 3100 for performing data transmission to a user equipment in a communications system supporting carrier aggregation of at least one first carrier on which a short TTI is applied and at least one second carrier on which a long TTI is applied, according to some embodiments of the present disclosure. The apparatus 3100 may be embodied at or as at least part of a base station.

In particular, the apparatus 3100 comprises a scheduler 3110 and a transmitter 3120. The scheduler 3110 is configured to transmit at least one DL scheduling grant corresponding to data transmission to the user equipment in a DL control region of at least one of a short TTI on a first carrier and a long TTI on a second carrier. The transmitter 3120 is configured to perform DL data transmission towards the user equipment in a data transmission region of a short TTI on the first carrier and in the data transmission region of a long TTI on the second carrier as indicated by the at least one DL scheduling grant.

In an embodiment, the scheduler 3110 may be configured to transmit, in the DL control region of a short TTI on the first carrier, a DL scheduling grant corresponding to data transmission on the first carrier and to transmit, in the DL control region of a long TTI on the second carrier, a DL scheduling grant corresponding to data transmission on the second carrier. The transmitter 3120 may be configured to perform the DL data transmission on the first carrier in the short TTI where the corresponding DL scheduling grant is transmitted or in a short TTI immediately following the short TTI where the corresponding DL scheduling grant is transmitted, and to perform the DL data transmission on the second carrier in the long TTI where the corresponding DL scheduling grant is transmitted or in a long TTI immediately following the long TTI where the corresponding DL scheduling grant is transmitted.

In another embodiment, the scheduler 3110 may be configured to transmit, in the DL control region of a short TTI on the first carrier, a DL scheduling grant corresponding to data transmission on the second carrier and to transmit, in the DL control region of a short TTI on the first carrier, a DL scheduling grant corresponding to data transmission on the first carrier. The transmitter 3120 may be configured to perform the DL data transmission on the first carrier in the short TTI where the corresponding DL scheduling grant is transmitted or in a short TTI immediately following the short TTI where the corresponding DL scheduling grant is transmitted, and to perform the DL data transmission on the second carrier in a long TTI whose index $n_{long}$ and the index $n_{short}$ of the short TTI where the corresponding DL scheduling grant is transmitted have a relationship of $n_{long}=n_{short}/2$, wherein $n_{short}$ is an even integer.

In yet another embodiment, the scheduler 3130 may be configured to transmit, in the DL control region of a long TTI on the second carrier, a DL scheduling grant corresponding to data transmission on the second carrier and a DL scheduling grant corresponding to data transmission on the first carrier. The transmitter 3120 may be configured to perform the DL data transmission on the second carrier in the long TTI where the corresponding DL scheduling grant is transmitted or in a long TTI immediately following the long TTI where the corresponding DL scheduling grant is transmitted, and to perform the DL data transmission on the first carrier in a short TTI whose index $n_{short}$ and the index $n_{long}$ of the long TTI where the corresponding DL scheduling grant is transmitted have a relationship of $n_{long}=\text{floor}(n_{short}/2)$, wherein $n_{short}$ is an integer, or perform the DL data transmission on the first carrier in a short TTI whose index $n_{short}$ and the index $n_{long}$ of the long TTI where the corresponding DL scheduling grant is transmitted have a relationship of $n_{long}=\text{floor}((n_{short}-1)/2$, wherein $n_{short}$ is an integer.

The above scheduler 3110 and transmitter 3120 may be configured to implement the corresponding operations or steps as described with reference to FIGS. 3-9 and thus will not be detailed herein for the sake of brevity.

Figure 32:
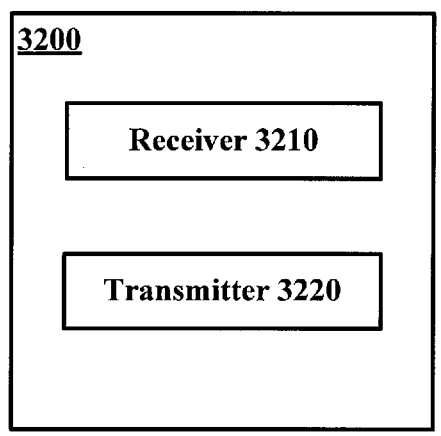
FIG. 32 illustrates a schematic block diagram of an apparatus 3200 for transmitting HARQ feedback to a base station according to some embodiments of the present disclosure.

FIG. 32 illustrates a schematic block diagram of an apparatus 3200 for transmitting HARQ feedback to a base station in a communications system supporting carrier aggregation of at least one first carrier on which a short TTI is applied and at least one second carrier on which a long TTI is applied, according to some embodiments of the present disclosure. The apparatus 3200 may be embodied at or as at least part of a user equipment.

In particular, the apparatus 3200 comprises a receiver 3210 and a transmitter 3220. The receiver 3210 is configured to receive DL data transmission from the base station in a data transmission region of a long TTI on a second carrier and in the data transmission region of a short TTI on a first carrier. The transmitter 3220 is configured to transmit HARQ feedback for the received DL data transmission towards the base station in an UL control region of at least one of a short TTI on the first carrier and a long TTI on the second carrier.

In an embodiment, the transmitter 3220 may be configured to transmit, on the first carrier, the HARQ feedback for the DL data transmission received on the first carrier in a short TTI immediately following or two short TTIs later than the one where the DL data transmission is received.

In a further embodiment, the transmitter 3220 may be configured to transmit, on the second carrier, the HARQ feedback for the DL data transmission received on the second carrier in a long TTI immediately following or two long TTIs later than the one where the DL data transmission is received.

In another embodiment, the transmitter 3220 may be configured to transmit, on the first carrier, the HARQ feedback for the DL data transmission received on the second carrier in either of the following: a short TTI whose index $n_{short}$ and the index $n_{long}$ of the long TTI where the DL data transmission is received have a relationship of $n_{short}=2*(n_{long}+1)+1$, wherein $n_{long}$ is an integer; or a short TTI whose index $n_{short}$ and the index $n_{long}$ of the long TTI where the DL data transmission is received have a relationship of $n_{short}=2*(n_{long}+1)$, wherein $n_{long}$ is an integer.

In yet another embodiment, the transmitter 3220 may be configured to transmit, on the second carrier, the HARQ feedback for the DL data transmission received on the second carrier in a long TTI immediately following or two long TTIs later than the long TTI where the DL data transmission is received, and to transmit, on the second carrier, the HARQ feedback for the DL data transmission received on the first carrier is transmitted in a long TTI whose index $n_{long}$ and the index $n_{short}$ of the short TTI where the DL data transmission is received have a relationship of $n_{long}=\text{floor}(n_{short}/2)+1$, wherein $n_{short}$ is an integer.

In yet another embodiment, the transmitter 3220 may be configured to transmit, on the first carrier, the HARQ feedback for the DL data transmission received on the first carrier in the short TTI where the DL data transmission is received.

In a further embodiment, the transmitter 3220 may be configured to transmit, on the second carrier, the HARQ feedback for the DL data transmission received on the second carrier in the long TTI where the DL data transmission is received; or to transmit, on the first carrier, the HARQ feedback for the DL data transmission received on the second carrier in a short TTI whose index $n_{short}$ and the index $n_{long}$ of the long TTI where the DL data transmission is received have a relationship of $n_{short}=2*n_{long}+1$, wherein $n_{long}$ is an integer.

In yet another embodiment, the transmitter 3220 may be configured to transmit, on the second carrier, the HARQ feedback for the DL data transmission received on the second carrier in the long TTI where the DL data transmission is received, and to transmit, on the second carrier, the HARQ feedback for the DL data transmission received on the first carrier in a long TTI whose index $n_{long}$ and the index $n_{short}$ of the short TTI where the DL data transmission is received have a relationship of $n_{long}=\text{floor}((n_{short}-1)/2)+1$, wherein $n_{short}$ is an integer.

The above receiver 3210 and transmitter 3220 may be configured to implement the corresponding operations or steps as described with reference to FIGS. 10-16 and thus will not be detailed herein for the sake of brevity.

Figure 33:
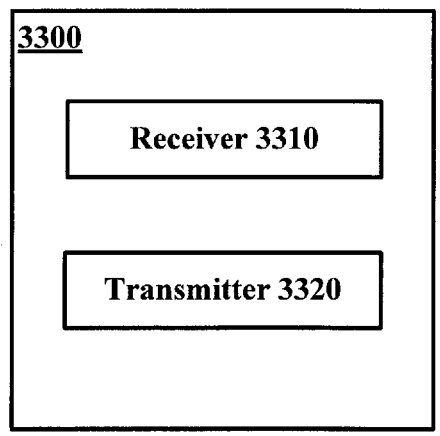
FIG. 33 illustrates a schematic block diagram of an apparatus 3300 for performing data transmission to a base station according to some embodiments of the present disclosure.

FIG. 33 illustrates a schematic block diagram of an apparatus 3300 for performing data transmission to a base station in a communications system supporting carrier aggregation of at least one first carrier on which a short TTI is applied and at least one second carrier on which a long TTI is applied. The apparatus 3300 may be embodied at or as at least part of a user equipment.

In particular, the apparatus 3300 comprises a receiver 3310 and a transmitter 3320. The receiver 3310 is configured to receive at least one UL scheduling grant for data transmission to the base station in a DL control region of at least one of a short TTI on a first carrier and a long TTI on a second carrier. The transmitter 3320 is configured to perform UL data transmission towards the base station in a data transmission region of a short TTI on the first carrier and in the data transmission region of a long TTI on the second carrier as indicated by the at least one UL scheduling grant.

In an embodiment, the receiver 3310 may be configured to receive, in the DL control region of a short TTI on the first carrier, an UL scheduling grant for data transmission on the first carrier and to receive, in the DL control region of a long TTI on the second carrier, an UL scheduling grant for data transmission on the second carrier. The transmitter 3320 may be configured to perform the UL data transmission on the first carrier in a short TTI immediately following the short TTI where the corresponding UL scheduling grant is received, and to perform the UL data transmission on the second carrier in a long TTI immediately following the long TTI where the corresponding UL scheduling grant is received.

In another embodiment, the receiver 3310 may be configured to receive, in the DL control region of a short TTI on the first carrier, an UL scheduling grant for data transmission on the first carrier and to receive, in the DL control region of a short TTI on the first carrier, an UL scheduling grant for data transmission on the second carrier. The transmitter 3320 may be configured to perform the UL data transmission on the first carrier in a short TTI immediately following the short TTI where the corresponding UL scheduling grant is received, and to perform the UL data transmission on the second carrier in a long TTI whose index $n_{long}$ and the index $n_{short}$ of the short TTI where the corresponding UL scheduling grant is received have a relationship of $n_{long}=n_{short}/2$, wherein $n_{short}$ is an even integer or in a long TTI whose index $n_{long}$ and the index $n_{short}$ of the short TTI where the corresponding UL scheduling grant is received have a relationship of $n_{long}=1+n_{short}/2$, wherein $n_{short}$ is an even integer.

In yet another embodiment, the receiver 3310 may be configured to receive, in the DL control region of a long TTI on the second carrier, an UL scheduling grant for data transmission on the first carrier and an UL scheduling grant for data transmission on the second carrier. The transmitter 3320 may be configured to perform the UL data transmission on the first carrier in a short TTI whose index $n_{short}$ and the index $n_{long}$ of the long TTI where the corresponding UL scheduling grant is received have a relationship of $n_{long}=\text{floor}((n_{short}-1)/2)$, wherein $n_{long}$ is an integer, and to perform the UL data transmission on the second carrier in a long TTI immediately following the long TTI where the corresponding UL scheduling grant is received.

The above receiver 3310 and transmitter 3320 may be configured to implement the corresponding operations or steps as described with reference to FIGS. 17-23 and thus will not be detailed herein for the sake of brevity.

Figure 34:
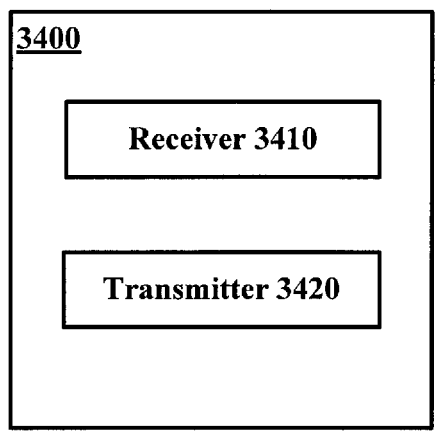
FIG. 34 illustrates a schematic block diagram of an apparatus 3400 for transmitting HARQ feedback to a user equipment according to some embodiments of the present disclosure.

FIG. 34 illustrates a schematic block diagram of an apparatus 3400 for transmitting HARQ feedback to a user equipment in a communications system supporting carrier aggregation of at least one first carrier on which a short TTI is applied and at least one second carrier on which a long TTI is applied. The apparatus 3400 may be embodied at or as at least part of a base station.

In particular, the apparatus comprises a receiver 3410 and a transmitter 3420. The receiver 3410 is configured to receive UL data transmission from the user equipment in a data transmission region of a long TTI on a second carrier and in the data transmission region of a short TTI on a first carrier. The transmitter 3420 is configured to transmit HARQ feedback to the received UL data transmission towards the user equipment in a DL control region of at least one of a short TTI on the first carrier and a long TTI on the second carrier.

In an embodiment, the transmitter 3420 may be configured to transmit, on the first carrier, the HARQ feedback for the UL data transmission received on the first carrier in a short TTI immediately following or two short TTIs later than the short TTI where the UL data transmission is received. The transmitter 3420 may be further configured to transmit, on the second carrier, the HARQ feedback for the UL data transmission received on the second carrier in a long TTI immediately following or two long TTIs later than the long TTI where the UL data transmission is received.

In another embodiment, the transmitter 3420 may be configured to transmit, on the first carrier, the HARQ feedback for the UL data transmission received on the second carrier in either of the following: a short TTI whose index $n_{short}$ and the index $n_{long}$ of the long TTI where the UL data transmission is received have a relationship of $n_{short}=2*(n_{long}+1)+1$, wherein $n_{long}$ is an integer; or a short TTI whose index $n_{short}$ and the index $n_{long}$ of the long TTI where the UL data transmission is received have a relationship of $n_{short}=2*(n_{long}+1)$, wherein $n_{long}$ is an integer.

In yet another embodiment, the transmitter 3420 may be configured to transmit, on the second carrier, the HARQ feedback for the UL data transmission received on the second carrier in a long TTI immediately following or two long TTIs later than the long TTI where the UL data transmission is received, and to transmit, on the second carrier, the HARQ feedback for the UL data transmission received on the first carrier in in either of the following: a long TTI whose index $n_{long}$ and the index $n_{short}$ of the short TTI where the UL data transmission is received have a relationship of $n_{long}=\text{floor}((n_{short}+1)/2)+1$, wherein $n_{short}$ is an integer; or a long TTI whose index $n_{long}$ and the index $n_{short}$ of the short TTI where the UL data transmission is received have a relationship of $n_{long}=\text{floor}(n_{short}/2)+1$, wherein $n_{short}$ is an integer.

The above receiver 3410 and transmitter 3420 may be configured to implement the corresponding operations or steps as described with reference to FIGS. 24-30 and thus will not be detailed herein for the sake of brevity.

Figure 35:
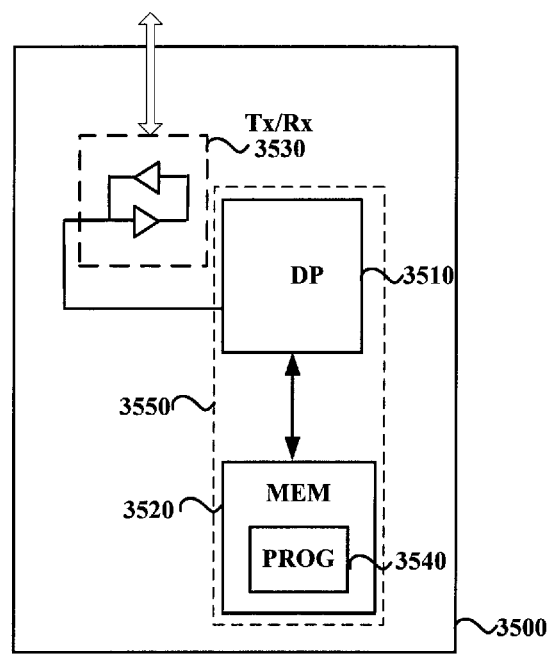
FIG. 35 illustrates a schematic block diagram of an apparatus 3500 for performing data transmission according to some embodiments of the present disclosure or for transmitting HARQ feedback according to some other embodiments of the present disclosure.

FIG. 35 illustrates a schematic block diagram of an apparatus 3500 for performing data transmission according to some embodiments of the present disclosure or for transmitting HARQ feedback according to some other embodiments of the present disclosure. The apparatus 3500 may be embodied at or as at least part of a base station. Alternatively, the apparatus 3500 may be embodied at or as at least part of a user equipment.

The apparatus 3500 comprises at least one processor 3510, such as a data processor (DP) and at least one memory (MEM) 3520 coupled to the processor 3510. The apparatus 3500 may further comprise a transmitter TX and receiver RX 3530 coupled to the processor 3510 for establishing wireless communications with other apparatuses. The MEM 3520 stores a program (PROG) 3540. The PROG 3540 may include instructions that, when executed on the associated processor 3510, enable the apparatus 3500 to operate in accordance with some embodiments of the present disclosure, for example to perform the method 300, 1000, 1700 or 2400 as described. A combination of the at least one processor 3510 and the at least one MEM 3520 may form processing means 3550 adapted to implement some embodiments of the present disclosure.

The MEM 3520 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 3510 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a base station comprising:
performing data transmission to a user equipment in a communications system supporting carrier aggregation of at least one first carrier on which a short Transmission Time Interval, TTI is applied and at least one second carrier on which a long TTI is applied;
transmitting at least one downlink scheduling grant corresponding to data transmission to the user equipment in a downlink control region of at least one of a short TTI on a first carrier and a long TTI on a second carrier; and
performing downlink data transmission towards the user equipment in a data transmission region of a short TTI on the first carrier and in the data transmission region of a long TTI on the second carrier as indicated by the at least one downlink scheduling grant;
wherein said transmitting at least one downlink scheduling grant corresponding to data transmission to the user equipment comprises transmitting, in the downlink control region of a short TTI on the first carrier, a downlink scheduling grant corresponding to data transmission on the second carrier and transmitting, in the downlink control region of a short TTI on the first carrier, a downlink scheduling grant corresponding to data transmission on the first carrier;
the downlink data transmission on the first carrier is performed in the short TTI where the corresponding downlink scheduling grant is transmitted or in a short TTI immediately following the short TTI where the corresponding downlink scheduling grant is transmitted; and
the downlink data transmission on the second carrier is performed in a long TTI whose index $n_{long}$ and the index $n_{short}$ of the short TTI where the corresponding downlink scheduling grant is transmitted have a relationship of $n_{long}=n_{short}/2$, wherein $n_{short}$ is an even integer.

2. The method according to claim 1, wherein
said transmitting at least one downlink scheduling grant corresponding to data transmission to the user equipment comprises transmitting, in the downlink control region of a short TTI on the first carrier, a downlink scheduling grant corresponding to data transmission on the first carrier and transmitting, in the downlink control region of a long TTI on the second carrier, a downlink scheduling grant corresponding to data transmission on the second carrier;
the downlink data transmission is performed on the first carrier in the short TTI where the corresponding downlink scheduling grant is transmitted or in a short TTI immediately following the short TTI where the corresponding downlink scheduling grant is transmitted; and
the downlink data transmission is performed on the second carrier in the long TTI where the corresponding downlink scheduling grant is transmitted or in a long TTI immediately following the long TTI where the corresponding downlink scheduling grant is transmitted.

3. The method according to claim 1, wherein
said transmitting at least one downlink scheduling grant corresponding to data transmission to the user equipment comprises transmitting, in the downlink control region of a long TTI on the second carrier, a downlink scheduling grant corresponding to data transmission on the second carrier and a downlink scheduling grant corresponding to data transmission on the first carrier;
the downlink data transmission on the second carrier is performed in the long TTI where the corresponding downlink scheduling grant is transmitted or in a long TTI immediately following the long TTI where the corresponding downlink scheduling grant is transmitted; and
the downlink data transmission on the first carrier is performed in a short TTI whose index $n_{short}$ and the index $n_{long}$ of the long TTI where the corresponding downlink scheduling grant is transmitted have a relationship of $n_{long}=\text{floor}(n_{short}/2)$, wherein $n_{short}$ is an integer; or
the downlink data transmission on the first carrier is performed in a short TTI whose index $n_{short}$ and the index $n_{long}$ of the long TTI where the corresponding downlink scheduling grant is transmitted have a relationship of $n_{long}=\text{floor}((n_{short}-1)/2$, wherein $n_{short}$ is an integer.

4. A method at a user equipment comprising:
transmitting Hybrid Automatic Repeat reQuest, HARQ feedback to a base station in a communications system supporting carrier aggregation of at least one first carrier on which a short Transmission Time Interval, TTI, is applied and at least one second carrier on which a long TTI is applied;
receiving downlink data transmission from the base station in a data transmission region of a short TTI on a first carrier and in the data transmission region of a long TTI on a second carrier; and
transmitting HARQ feedback for the received downlink data transmission towards the base station in an uplink control region of at least one of a short TTI on the first carrier and a long TTI on the second carrier;
wherein the HARQ feedback for the downlink data transmission received on the second carrier is transmitted on the second carrier in a long TTI immediately following or two long TTIs later than the long TTI where the downlink data transmission is received; and
the HARQ feedback for the downlink data transmission received on the first carrier is transmitted on the second carrier in a long TTI whose index $n_{long}$ and the index $n_{short}$ of the short TTI where the downlink data transmission is received have a relationship of $n_{long}=\text{floor}(n_{short}/2)+1$, wherein $n_{short}$ is an integer.

5. The method according to claim 4, wherein
the HARQ feedback for the downlink data transmission received on the first carrier is transmitted on the first carrier in a short TTI immediately following or two short TTIs later than the short TTI where the downlink data transmission is received.

6. The method according to claim 5, wherein
the HARQ feedback for the downlink data transmission received on the second carrier is transmitted on the second carrier in a long TTI immediately following or two long TTIs later than the long TTI where the downlink data transmission is received.

7. The method according to claim 5, wherein
the HARQ feedback for the downlink data transmission received on the second carrier is transmitted on the first carrier in either of the following:
a short TTI whose index $n_{short}$ and the index $n_{long}$ of the long TTI where the downlink data transmission is received have a relationship of $n_{short}=2*(n_{long}+1)+1$, wherein $n_{long}$ is an integer; and
a short TTI whose index $n_{short}$ and the index $n_{long}$ of the long TTI where the downlink data transmission is received have a relationship of $n_{short}=2*(n_{long}+1)$, wherein $n_{long}$ is an integer.

8. The method according to claim 4, wherein
the HARQ feedback for the downlink data transmission received on the first carrier is transmitted on the first carrier in the short TTI where the downlink data transmission is received.

9. The method according to claim 8, wherein
the HARQ feedback for the downlink data transmission received on the second carrier is transmitted on the second carrier in the long TTI where the downlink data transmission is received; or
the HARQ feedback for the downlink data transmission received on the second carrier is transmitted on the first carrier in a short TTI whose index $n_{short}$ and the index $n_{long}$ of the long TTI where the downlink data transmission is received have a relationship of $n_{short}=2*n_{long}+1$, wherein $n_{long}$ is an integer.

10. The method according to claim 4, wherein
the HARQ feedback for the downlink data transmission received on the second carrier is transmitted on the second carrier in the long TTI where the downlink data transmission is received; and
the HARQ feedback for the downlink data transmission received on the first carrier is transmitted on the second carrier in a long TTI whose index $n_{long}$ and the index $n_{short}$ of the short TTI where the downlink data transmission is received have a relationship of $n_{long}=\text{floor}((n_{short}-1)/2)+1$, wherein $n_{short}$ is an integer.

11. A method at a user equipment comprising:
performing data transmission to a base station in a communications system supporting carrier aggregation of at least one first carrier on which a short Transmission Time Interval, TTI is applied and at least one second carrier on which a long TTI is applied;
receiving at least one uplink scheduling grant for data transmission to the base station in a downlink control region of at least one of a short TTI on a first carrier and a long TTI on a second carrier; and
performing uplink data transmission towards the base station in a data transmission region of a short TTI on the first carrier and in the data transmission region of a long TTI on the second carrier as indicated by the at least one uplink scheduling grant;
said receiving at least one uplink scheduling grant for data transmission to the base station comprises receiving, in the downlink control region of a short TTI on the first carrier, an uplink scheduling grant for data transmission on the first carrier and receiving, in the downlink control region of a short TTI on the first carrier, an uplink scheduling grant for data transmission on the second carrier;
the uplink data transmission on the first carrier is performed in a short TTI immediately following the short TTI where the corresponding uplink scheduling grant is received; and
the uplink data transmission on the second carrier is performed in a long TTI whose index $n_{long}$ and the index $n_{short}$ of the short TTI where the corresponding uplink scheduling grant is received have a relationship of $n_{long}=n_{short}/2$, wherein $n_{short}$ is an even integer or in a long TTI whose index $n_{long}$ and the index $n_{short}$ of the short TTI where the corresponding uplink scheduling grant is received have a relationship of $n_{long}=1+n_{short}/2$ wherein $n_{short}$ is an even integer.

12. The method according to claim 11, wherein
said receiving at least one uplink scheduling grant for data transmission to the base station comprises receiving, in the downlink control region of a short TTI on the first carrier, an uplink scheduling grant for data transmission on the first carrier and receiving, in the downlink control region of a long TTI on the second carrier, an uplink scheduling grant for data transmission on the second carrier;
the uplink data transmission is performed on the first carrier in a short TTI immediately following the short TTI where the corresponding uplink scheduling grant is received; and
the uplink data transmission is performed on the second carrier in a long TTI immediately following the long TTI where the corresponding uplink scheduling grant is received.

13. The method according to claim 11, wherein
said receiving at least one uplink scheduling grant for data transmission to the base station comprises receiving, in the downlink control region of a long TTI on the second carrier, an uplink scheduling grant for data transmission on the first carrier and an uplink scheduling grant for data transmission on the second carrier;
the uplink data transmission on the first carrier is performed in a short TTI whose index $n_{short}$ and the index $n_{long}$ of the long TTI where the corresponding uplink scheduling grant is received have a relationship of $n_{long}=\text{floor}((n_{short}-1)/2)$, wherein $n_{long}$ is an integer; and
the uplink data transmission on the second carrier is performed in a long TTI immediately following the long TTI where the corresponding uplink scheduling grant is received.

* * * * *

UNITED STATES PATENT AND TRADEMARK OFFICE
CERTIFICATE OF CORRECTION

PATENT NO. : 10,455,610 B2
APPLICATION NO. : 15/758581
DATED : October 22, 2019
INVENTOR(S) : Zhennian Sun et al.

Page 1 of 1

It is certified that error appears in the above-identified patent and that said Letters Patent is hereby corrected as shown below:

In the Specification

Column 16, Detailed Description, Lines 36-37; Delete "$n_{long}=_{floor}(n_{short}/2)+1$," and insert --$n_{long}=floor(n_{short}/2)+1$,-- therefor Column 23, Detailed Description, Line 44; Delete "$n_{short}=_{2*}(n_{long}+1)$," and insert --$n_{short}=2*(n_{long}+1)$,-- therefor Column 27, Detailed Description, Lines 21-22; Delete "$n_{short}=_{2*}(n_{long}+1)$," and insert --$n_{short}=2*(n_{long}+1)$,-- therefor Column 29, Detailed Description, Lines 29-30; Delete "$n_{short}=_{2*}(n_{long}+1)$," and insert --$n_{short}=2*(n_{long}+1)$,-- therefor In the Claims Column 34, Line 22; In Claim 11, after "$n_{long}=1+n_{short}/2$", insert --,--

Signed and Sealed this
Twenty-fourth Day of November, 2020

Andrei Iancu
*Director of the United States Patent and Trademark Office*